United States Patent [19]

Lubarsky et al.

[11] Patent Number: 4,893,340

[45] Date of Patent: Jan. 9, 1990

[54] MULTIJUNCTION UNIT APPARATUS FOR USE IN A DIGITAL NETWORK

[75] Inventors: Daniel P. Lubarsky, San Jose; George A. Weigt, Livermore; Mark E. Haisch, Freemont, all of Calif.

[73] Assignee: Pacific Bell, San Francisco, Calif.

[21] Appl. No.: 254,275

[22] Filed: Oct. 5, 1988

[51] Int. Cl.[4] .............................................. H04L 9/00

[52] U.S. Cl. .......................................... 380/50; 380/9; 380/25; 370/60; 370/77; 370/92; 370/112; 379/93

[58] Field of Search .................... 364/200, 900; 380/9, 380/23, 25, 28, 49, 50; 370/55, 58, 59, 60, 63, 64, 66, 67, 77, 85, 92, 105, 112; 379/93–96

[56] References Cited

U.S. PATENT DOCUMENTS

| | | | |
|---|---|---|---|
| 3,982,076 | 9/1976 | Hill et al. | 370/58 |
| 4,059,729 | 11/1977 | Eddy et al. | 370/55 X |
| 4,064,370 | 12/1977 | Coonce et al. | 370/58 |
| 4,160,128 | 7/1979 | Texier | 370/58 |
| 4,507,781 | 3/1985 | Alvarez, III et al. | 370/104 |
| 4,635,255 | 1/1987 | Clark et al. | 370/110.1 |
| 4,736,362 | 4/1988 | Clark et al. | 370/58 |
| 4,763,317 | 8/1988 | Lehman et al. | 370/58 |

OTHER PUBLICATIONS

Dunbar, B. J. et al., "Dataport-Channel Units for Digital Data System 56-kb/s Rate", *The Bell System Technical Journal,* vol. 61, No. 9, Nov. 1982, pp. 2741–2756.

Albert, W. G. et al., "Digital Terminal Physical Design", *The Bell System Technical Journal,* vol. 61, No. 9, Nov. 1982, pp. 2757–2790.

*Primary Examiner*—Stephen C. Buczinski

*Assistant Examiner*—Bernarr Earl Gregory

*Attorney, Agent, or Firm*—McCubbrey, Bartels, Meyer & Ward

[57] ABSTRACT

Disclosed is an adaptive multijunction unit apparatus for multiplexing data streams between a master computer and a plurality of slave computers coupled through telephone system communication lines. The apparatus receives and processes both user data and network data which can include commands instructing the apparatus to change the operating modes of its various circuit components. For example, the adaptive multijunction unit apparatus can respond to commands to raise or lower its data transmission rate or to switch between dual channel and single channel data transmission. The apparatus includes a splitter/combiner function which copies data received from the master computer, onto output ports directed to multiple slave computers.

18 Claims, 8 Drawing Sheets

FIGURE 2

NETWORK CONTROLER
COMAND PORT 460
MICRO-PROCESSOR 479
INPUT PORT 471
OUTPUT PORT 476
450
461
470
472
473
481
490
493
492
494
495

470

474
485
487
483
484
REPEATER 478
ENCRYPTOR 476
MICRO-PROCESSOR 479
MAJORITY DECISION LOGIC 477
DECRYPTOR 475
481
482
486
471
473b
473a
472b
472a

MULTIJUNCTION UNIT APPARATUS FOR USE IN A DIGITAL NETWORK

BACKGROUND OF THE INVENTION

The present invention relates to an apparatus for use in networks which connect a plurality of computers to form a computer network and, more particularly, to apparatus for multiplexing data streams between a master computer and a plurality of slave computers in such a network.

Many businesses have computer networks which extend over large geographic areas. The most economical manner for implementing such networks utilizes existing telephone lines to connect the various computers in the network. Computer networks that utilize the telephone system are known to the prior art. However, these computer networks are less than ideal. Problems arise from the use of transmission facilities which were designed for voice quality transmissions between two points and from the inclusion of components which are owned and maintained by separate commercial entities. However, because of the cost savings which are inherent in the use of the existing telephone system, it is desirable to adapt such network equipment for acceptable digital data transmission, if at all possible.

Existing computer networks suffer from a number of drawbacks. For example, prior art computer networks which utilize the telephone system are difficult to reconfigure either with regard to the speed at which data is transmitted within the telephone system or with regard to the topological configuration of the computer network. In prior art computer networks, telephone company technicians must be dispatched to various locations within the telephone system to affect a rate change in the computer network. If the new rate is not one of a small number of rates for which the equipment is designed, the actual interface circuitry within the telephone system must often be changed. As a result, it is practically impossible to change data rates in response to short term changes in the quality of the telephone lines carrying the data.

Short term increases in the noise on specific telephone lines are common. The telephone lines used for carrying the user's computer data are, in general, identical to the lines used to carry voice communications within the telephone system. These lines are bundled into cables with similar lines. The noise level on these lines depends upon a number of factors including the nature of the transmissions on lines bundled with those used for the computer network along routes which include a variety of different telephone company switching equipment.

To change the network speed or configuration, changes must be made in equipment which is neither owned or maintained by the computer network owner. This makes reconfiguration of the network difficult, since telephone company personnel must be coordinated with those of the network owner to affect a change.

Ideally, a network owner would like to be able to change the configuration of the network in response to observed error rates or the time of the day. Such reconfiguration, for example, would be useful in smoothing peak loads on the computer network. Such reconfigurability would also be useful in transferring specific services to offices in earlier time zones when the office providing the service in another time zone closes at the end of the day. In prior art systems, such reconfiguration requires that key components of the computer network be rewired by telephone company personnel or that special purpose hardware be installed at significant cost.

Another example of a drawback in prior art computer networks is the inability of the user to monitor and manage the computer network. If a failure occurs in the computer network, it is difficult to ascertain whether the failure is the result of a malfunction in the equipment supplied by the telephone company, either on or off of the network owner's premises, or in the equipment owned and maintained by the network owner. Hence, when a malfunction is detected, telephone company technicians are often needed to ascertain the location of the failure within the system. The time delays in waiting for such determinations to be made are often unacceptable. It would be advantageous to provide a means for allowing the network user to set loopbacks and other diagnostic aids within the computer network without the time delays and added expense inherent when telephone company personnel must be involved. Similarly, the computer network user would like to be able to access data showing error rates on the various communication links in the computer network.

A typical multipoint network having a master computer and a plurality of slave computers and utilizing the telephone system requires a form of multiplexing device referred to herein after as a multijunction unit. The multijunction unit combines data streams from various slave computers prior to transmitting the combined data to the master computer. One or more multijunction units are typically located in the telephone system and operate in conjunction with the $T_1$ carrier facilities of the system.

One problem inherent in combining the data streams from a large number of slave computers is that noise on the individual communication links coupling the slave computers to the master computer is combined as well. At any given time, only one computer is typically transmitting data to the master computer. However, noise on the communication links connecting the slave computers which are not transmitting data to the master computer is still present. This noise is independent of whether or not the slave computer in question is actually transmitting data. In prior art multijunction units, this noise is combined with the data from the active slave computer. As a result, the noise level increases with the number of slave computers in the computer network.

One method of reducing errors on the various communication links within the computer network is to encrypt the data using an error correcting code prior to transmission. However, such error encryption interferes with the "combining" function of a multijunction unit. Hence, it would be advantageous to provide a multijunction unit which could function properly on error encrypted data.

Broadly, it is an object of the present invention to provide an improved computer multijunction unit for use in computer networks utilizing the telephone system.

It is another object of the present invention to allow the use of encrypted data in a manner which achieves an improved overall error rate in the telephone network system without interfering with the combining function of the multijunction unit.

A related object of the present invention is to provide a multijunction unit which prevents noise in the data streams of non-active or non-selected slave channels from being combined with the data stream from the active slave channel.

It is a further object of the present invention to provide a multijunction unit in which the speed of data transmission can be altered automatically in response to observed error rates in the computer network.

These and other objects of the present invention which will become apparent to those skilled in the art from the following detailed description of the invention and the accompanying drawings.

SUMMARY OF THE INVENTION

The present invention comprises a multijunction unit for transferring digital data between at least three channels of a time-domain multiplexed communication link of a multipoint communication network which includes a plurality of network units with at least one of said network units comprising said multijunction unit. The network units are coupled to telephone system communication links. Each said network unit comprises a means for transmitting and receiving digital data in a frame mode in which said data is organized into frames on said communication links. Each said frame includes synchronization data, command data, error correcting data, and user data. Each said network unit also includes a means for storing an address identifying said network unit, a means for receiving commands from other network units in said computer network, said commands being specified by command data in a said frame received by said network unit, a means for generating command data in response to a received command included in said command data, a means for transmitting commands to other network units in said computer network, said transmitting means comprising means for inserting command data generated by said command data generating means into a said frame transmitted by said network unit, and a means for executing a said received command specifying said stored address as the target thereof.

The multijunction unit of the present invention further comprises first, second, and third input port means, each said input port means being coupled to a different incoming channel of a time-domain multiplexed communication link, each said input port means comprising means for receiving a primary channel word from the said incoming primary channel coupled thereto and first decrypting means for generating a data word corresponding to each said received primary channel word, each said generated data word comprising a portion of a said frame. In addition, the multijunction unit includes first, second, and third output port means, each said output port means being coupled to a different primary outgoing channel of said time-domain multiplexed communication link, each said output port means comprising means for receiving a said data word, first encrypting means for generating a said primary channel word from said received data word and means for transmitting said primary channel word on the said outgoing primary channel coupled thereto. The multijunction unit also includes a means for coupling a data word generated by said first input channel to the said receiving means in said second and third output port means, and a means for combining the said data words generated by said second and third input port means to form a combined data word and for coupling said combined data word to the said receiving means in said first output port means.

BRIEF DESCRIPTION OF THE DRAWINGS

FIG. 7(*b*) is a block diagram of a decryption circuit utilized in the preferred embodiment of the present invention.

DETAILED DESCRIPTION OF THE INVENTION

The multijunction unit to which the present invention is directed is best understood with reference to networks in which the apparatus attains many of its advantages. Hence, before proceeding with a detailed explanation of the multijunction unit, a discussion of a simple computer network utilizing the multijunction unit will be given.

Figure 1:
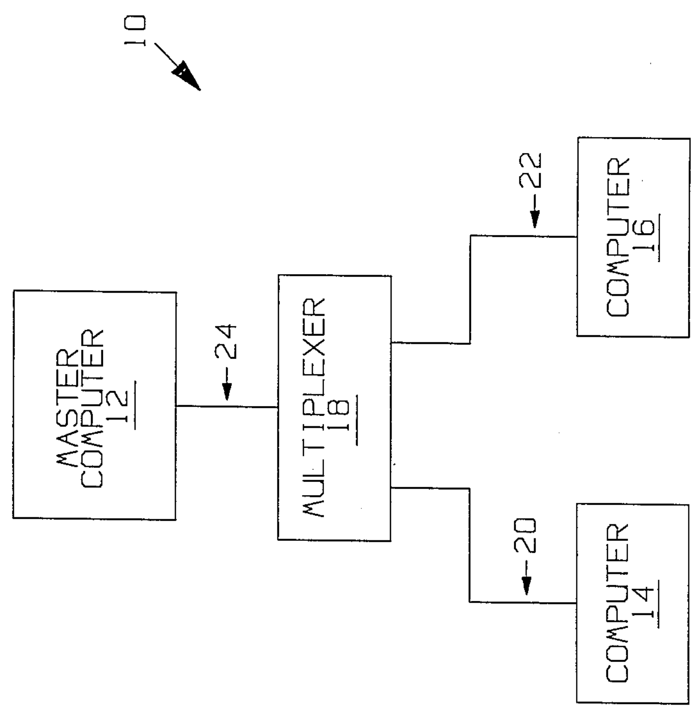
FIG. 1 is a block diagram of a simple computer network.

An example of a simple computer network 10 is shown in FIG. 1. Computer network 10 includes three computers 12, 14 and 16. Computer 12 is the master computer. Computers 14 and 16 are remote or slave computers which communicate with master computer 12 under the control of master computer 12.

A multiplexer 18 communicates each command from master computer 12 on a communication link 24 to both of the slave computers by copying each command input to it on communication link 24 onto branch communication links 20 and 22. Hence, each slave computer receives all commands transmitted by master computer 12. Each such command is addressed either to both of the slave computers or to a specified one of them. Each slave computer is programmed to respond only to those commands directed to it.

Multiplexer 18 combines the data streams sent by each of the slave computers 14 and 16 on communication links 20 and 22, respectively. The "combining" operation is typically an ORing of the data in each data stream. The combined data is then transmitted to master computer 12 on communication link 24. Hence, slave computers 14 and 16 must be programmed to respond to commands from master computer 12 one at a time. This is normally accomplished by using a polling protocol. Master computer 12 sends a command to one of the slave computers requesting information. The slave computer in question then responds. The other slave computer is programmed to be silent during this response.

Figure 2:
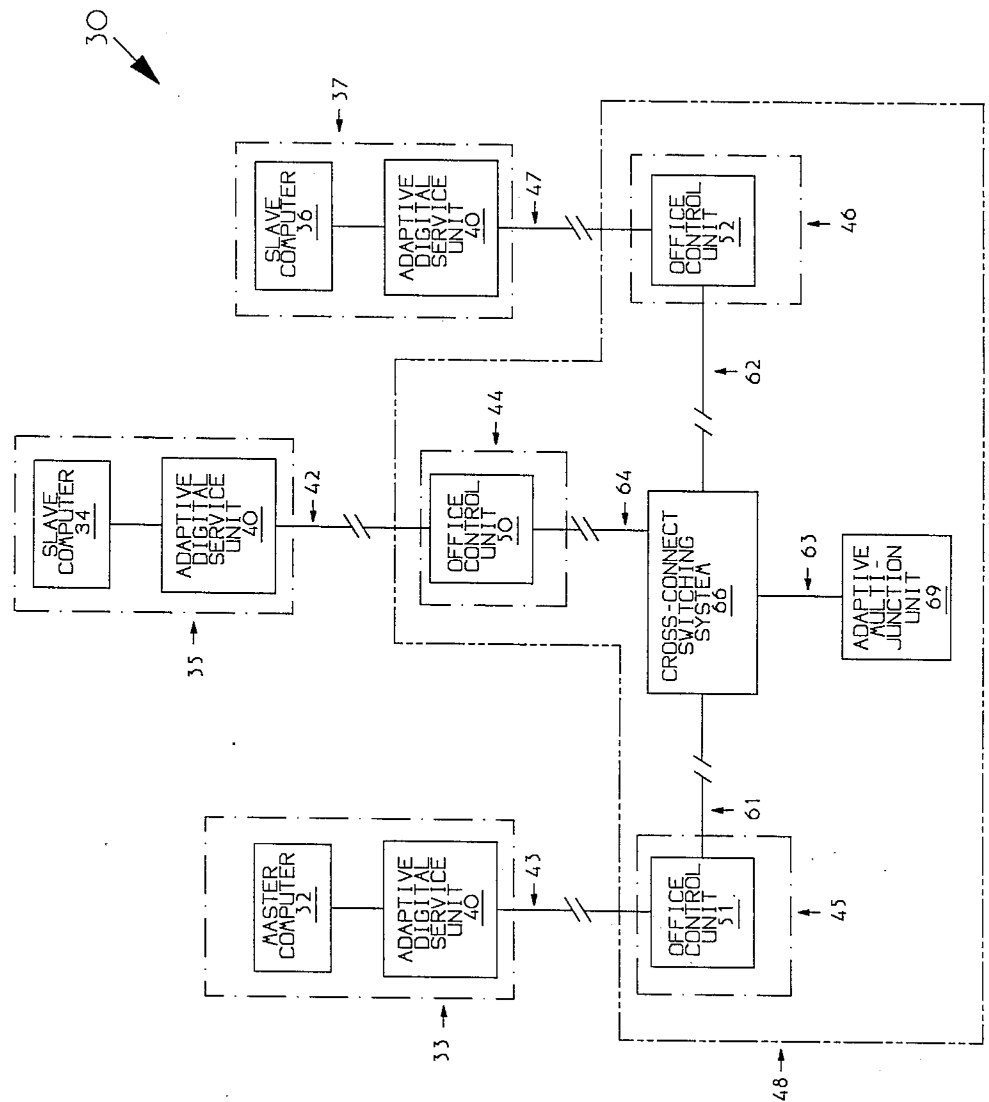
FIG. 2 is a block diagram of a telephone system based implementation of the computer network shown in FIG. 1 which utilizes the present invention.

A block diagram of a telephone system-based implementation of computer network 10 is shown in FIG. 2 at 30. Computer network 30 includes a master computer 32 at location 33, a slave computer 34 at location 35 and a slave computer 36 at location 37. Each computer sends data to and from a first network component referred to as an adaptive digital service unit 40 located on the same premises as the computer in question. Data is communicated between the adaptive digital service unit 40 and the computer connected thereto in a standard digital format such as RS-232.

The various adaptive digital service units of the network format the computer data for transmission to and from a telephone central office over a pair of conventional subscriber loops of the type used for normal voice communications. In computer network 30, master computer 32 communicates with central office 45 over the subscriber loops shown at 43. Similarly, slave computer 34 communicates with central office 44 over subscriber loops 42, and slave computer 36 communicates with central office 46 over subscriber loops 47. To clarify FIG. 2, the subscriber loops in question are shown as a single communication path in the figure. However, it is to be understood that each such path comprises two subscriber loops, one for transmitting data in each direction relative to the central office. The central offices in question are all part of a telephone system 48.

Each pair of subscriber loops terminates on a second network component referred to as an adaptive office channel unit. In computer network 30, subscriber loops 42, 43, and 47, terminate on adaptive office channel units 50, 51, and 52, respectively. The adaptive office channel units reformat the data on the subscriber loops connected thereto to a format compatible with conventional $T_1$ communication links within telephone system 48. Exemplary $T_1$ communication links are indicated at 61–64.

Computer network 30 also includes an adaptive multijunction unit 69 which is a third type of network unit and which performs functions analogous to multiplexer 18 shown in FIG. 1. The adaptive multijunction unit 69 copies the data input to it on specified channels of $T_1$ communication link 63 which are assigned to adaptive office channel unit 51 to a set of channels on $T_1$ communication link 63 which are assigned to adaptive office channel units 52 and 50. In addition, adaptive junction unit 69 ORs the data input to it on the $T_1$ channels assigned to adaptive office channel units 50 and 52 and transmits the ORed data on the channels assigned to office control unit 51.

Telephone system 48 includes a cross-connect system 66 which is utilized for routing data between the $T_1$ channels of the various $T_1$ communication links. For example, cross-connect system 66 routes the data placed in preassigned channels of $T_1$ communication link 62 by office control unit 52 to the appropriate channels of $T_1$ communication link 63 where it is operated on by adaptive multijunction unit 69. Cross-connect system 66 is constructed from a number of cross-connect switches located at different geographical locations within telephone system 48; however, for simplicity, it is shown as a single block in the figure.

In addition to communicating data to and from the various computers in the computer network, the adaptive digital service units, adaptive office channel units, and the adaptive multijunction units communicate with each other to affect a number of useful network management functions. In one sense, a computer network utilizing the present invention comprises two computer networks. The first computer network consists of the user's computers, i.e., master computer 32 and slave computers 34 and 36 shown in FIG. 2. The second network consists of the adaptive digital service units, adaptive office channel units, and adaptive multijunction units. The elements of this second network communicate with each other over the same telephone lines used by the computers in the first network. This second computer network will be referred to as the telephone system computer network in the following discussion.

Each of the elements in the telephone system computer network includes an onboard dedicated computer which will be referred to as a process and control circuit to distinguish it from the computers in the user's computer network. These process and control circuits send and receive instructions and data to and from each other on the same communication links used for transmitting data between the various computers in the computer network. These process and control circuits are also responsible for monitoring and, in some cases, taking actions which correct and/or reduce transmission errors within the telephone system computer network.

The communication links used in the present invention are designed for carrying voice quality data. Digital data of the type communicated in a computer network requires a much lower error rate than voice data. The error rates in question may depend on other data being transmitted on adjacent lines in the telephone system, and hence, can vary with the time of day and other environmental factors. The various network units, i.e., adaptive digital service units, adaptive office channel units, and adaptive multijunction units, include circuitry for correcting some of the transmission errors. In addition, all of the process and control circuits are coupled to circuitry which monitors error rates on the communication links connected thereto, and reports those error rates to the adaptive office channel unit connected to the master computer which may take action to reduce the error rates by sending commands to the various process and control circuits throughout the network.

A computer network utilizing the present invention provides superior error-related network management features which maximize the data throughout of the telephone system computer network while keeping error rates at acceptable levels. For example, the process and control circuits may be used to change the rate at which data is transmitted in the telephone system computer network. By adjusting the data rates, transmission errors resulting from noise are often significantly reduced.

In prior art systems, data transmission rates could only be changed by sending technicians to the various geographical areas within the telephone system. Furthermore, changing the data rates often required replacing the equipment within the system. Hence, the data rates could not be optimally adjusted in response to transitory conditions having a relatively limited time span. As a result, the data rates were often set at values which were significantly below the maximum data rates which could be sustained over the majority of the network operation hours. In a computer network utilizing the present invention in conjunction with the adaptive office control units and adaptive digital service units described herein, the data transmission rates may be automatically reduced when unsatisfactory error rates are observed and then automatically increased when the condition causing the error rates subsides. Thus, the mean data transmission rate in the present invention is significantly higher than that obtained in prior art networks.

The manner in which the present invention operates requires a knowledge of the various data formats and communication protocols utilized in a computer network which employs the present invention. The computer network in question communicates in two data formats which will be referred to as the framed and unframed formats. The framed format which is utilized at transmission rates below 64K bits/sec will be described first.

Figure 3:
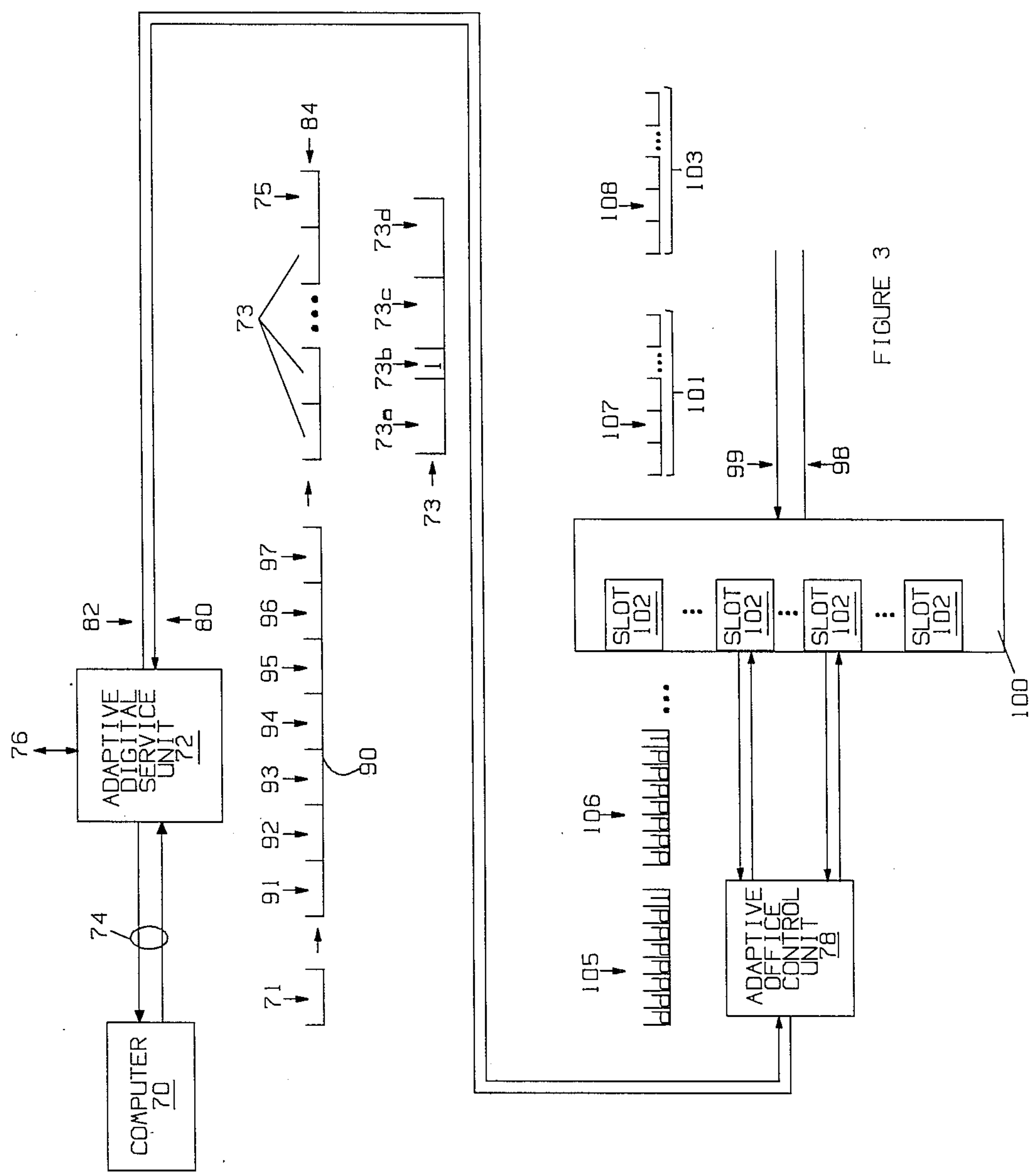
FIG. 3 illustrates the formatting of data transferred between a user's computing equipment and telephone company $T_1$ communication links.

FIG. 3 illustrates an interface between the user's computing equipment and a $T_1$ communication link via two subscriber loops. A user's computer 70 communicates with an adaptive digital service unit 72 according to the present invention over a serial communication line 74 which links other computers in the user's computer network through the telephone system. The user may also communicate with the various elements of the telephone system computer network through a command port 76 in adaptive digital service unit 72. Adaptive digital service unit 72 communicates with an adaptive office channel unit 78 over two subscriber loops 80 and 82. Subscriber loop 82 is used to send data to adaptive office channel unit 78, and subscriber loop 80 is used to receive data from the adaptive office channel unit. Communications on subscriber loops 80 and 82 are in a synchronous protocol which utilizes a clock in the telephone system for timing. When computer 70 communicates with adaptive digital service unit 72 in a synchronous protocol, it also uses this clock.

Data is communicated between computer 70 and adaptive digital service unit 72 in bytes, e.g., 8-bit words. A typical data byte is shown at 71. Adaptive digital service unit 72 accumulates a number of data bytes from computer 70 before transmitting the data to adaptive office channel unit 78 on subscriber loop 82. The data may be transferred in either the framed or unframed mode, with the latter allowing a higher data transmission rate.

When utilizing the framed mode, the data communicated between adaptive digital service unit 72 and adaptive office channel unit 78 is preferably formatted in 560-bit packets which will be referred to as frames. Each frame includes user data plus additional "overhead" or "system" data used by process and control circuits of the present invention. This additional data includes synchronization data, command data, and error correcting data. A typical frame 84 is constructed from 17 32-bit elements 73 and a 16-bit block 75. Each element 73 contains four fields. The first field 73*a* consists of 16 data bits. The second field 73*b* consists of a "1" used to maintain synchrony within the telephone system. The third field 73*c* consists of 10 more data bits and the fourth field 73*d* consists of 5 bits used for detecting and correcting transmission errors. The 5 bits in question will be referred to as either an ECC word or ECC/CRC bits for reasons which will be discussed in detail below.

Each frame is created from a loop interface data frame which is also produced within adaptive digital service unit 72. The loop interface frame is shown at 90 in FIG. 3. Loop interface frame 90 consists of 7 fields. The first field 91 consists of a 16-bit synchronization word which is used to achieve and maintain system synchronization. This field is preferably equal to 1FD0 in hexadecimal.

The second field 92 consists of a 16-bit command word which is used to signal the various process and control circuits in the telephone system computer network. The functions specified by this command word will be discussed in detail below. The third field 93 consists of a 16-bit address word identifying the device in the telephone system computer network to which the command in field 92 is directed.

The fourth field 94 consists of an 8-bit rate word which is used to communicate user data in an asynchronous transmission mode.

The fifth field 95 is a 2-bit signal word. One of these bits is used for security purposes, and the other specifies the number of user data bits which are actually being communicated in the frame.

The sixth field 96 contains the bulk of the user data, i.e., the data being communicated between the computers of the user's computer network. This field contains 384 bits.

Finally, the seventh field 97 contains a 16-bit word used to implement a secondary low speed communication channel.

Adaptive digital service unit 72 accumulates data bytes 71 from computer 70 in a FIFO buffer. Data is read from this buffer to create frame 84. The number of bits read from this buffer depends on the speed at which the network is running and whether or not the computer network is running in a synchronous or asynchronous mode.

Adaptive digital service unit 72 also stores any commands input on command port 76 until adaptive digital service unit 72 is ready to send the next frame 84 on subscriber loop 82. The time at which frames 84 are sent on subscriber loop 82 is determined by clock signals communicated to adaptive digital service unit 72 on subscriber loop 80.

The loop interface frame 90 is converted to frame 84 by the bitwise copying of successive data bits from loop frame 90 into the data bit fields of the elements of frame 84. The first element of frame 84 contains the 16 bits of the first field 91 of loop frame 90, followed by a "1", followed by the first 10 bits of the second field 92, followed by 5 ECC/CRC bits which are generated from the 26 bits of the first two elements using a conventional error correcting code. The added "1" guarantees that there is a sufficient density of one bits on the subscriber loops to maintain synchrony between the adaptive digital service unit and the adaptive office control unit connected thereto.

The second element of frame 84 contains the last 6 bits of command field 92 plus 10 bits of address field 93, followed by a "1", followed by the last six bits of field 93 plus the first 4 bits of rate field 94, followed by the 5 ECC/CRC bits for the second element. Successive elements of frame 84 are generated in a like manner.

Frame 84 then ends with an eighteenth element comprising the 16 bits of field 97. No ECC/CRC bits are calculated for this last 16-bit field.

Frame 84 is transmitted by the adaptive digital service unit 72 to adaptive office channel unit 78 on subscriber loop 82. The speed at which data is sent on subscriber loops 80 and 82, referred to as the loop speed, depends on the data rate between computer 70 and adaptive digital service unit 72 as well as the communication protocol being used, i.e., framed or unframed. The relationship between the loop speed and the data rate in the preferred embodiment of the present invention is shown in Table I.

The loop speed, i.e., the speed of data transmission over the subscriber loops is higher than the data rate at which the customer's digital processing equipment transmits data to the adaptive digital service unit, because of the additional data added to the customer's data. The preferred network provides data transmission at data rates typically ranging between 1.2 and 64. For example, the data rates provided in a practical embodiment include 1.2, 2.4, 4.8, 9.6, 19.2, 32, and 38.4K bits/sec in the framed mode. A data rate of 64K bits/sec is supported in the unframed mode described below.

As noted above, the number of user data bits which are inserted into frame 84 by adaptive digital service unit 72 depends on the data rate. The number of user data bits so inserted is also shown in Table I. At those data rates for which less than 384 bits are accumulated, the remaining bits of field 96 are loaded with ones. At a data rate of 1.2K bits/sec, the remaining 192 bits may be killed with a copy of the 192 bits accumulated from computer 70 instead of ones. This second copy of the user's data provides an additional error correcting capability.

Adaptive office channel unit 78 transforms frame 84 into a format which is compatible with a $T_1$ communication link within the telephone system. The $T_1$ communication links in the telephone system consist of two communication paths. The first path 98 is used to transmit data and the second path 99 is used to receive data. Data is transmitted on these paths in 24 time domain multiplexed channels. Each channel operates at a fixed rate of 64K bits/sec. The data is communicated in 24 byte $T_1$ frames, one byte of each frame corresponding to each time channel. Typical frames are shown in FIG. 3 at 101 and 103.

The interface between the individual channels and the $T_1$ communication links is accomplished by a conventional channel bank 100 which includes 24 "slots" 102. Each slot provides a means for sending data to and receiving data from a specified $T_1$ channel. In the preferred embodiment of a computer network utilizing the present invention, two of these slots are utilized by each adaptive office channel unit for transmitting frame 84. However, as will be explained in detail below, if a user wishes to purchase only a subset of the error correcting features of the telephone system computer network, only one of these slots is made available. To simplify the following discussion, it will be assumed that only one of these channels is utilized unless otherwise specified.

At a loop speed of 56K bits/sec, adaptive office channel unit 78 copies frame 84 into the first of these reserved $T_1$ channels by copying successive 7-bit segments of said frame on the $T_1$ channel during the time period reserved for the $T_1$ channel in question. Each 7-bit segment is augmented by adding one "1" bit to form an 8-bit byte. This byte is then copied to the $T_1$ channel. Two successive bytes created by adaptive office channel unit 78 are shown at 105 and 106 respectively. The "d" indicates a data bit and the "1" indicates the inserted one bit. Bytes 105 and 106 are copied to the $T_1$ channels shown at 107 and 108 respectively.

The added one bit assures that there is sufficient density of ones on the $T_1$ communication link to maintain the synchronization of the $T_1$ system. $T_1$ communication links are used to transmit data over long distances. Hence, they must utilize one or more repeaters. These repeaters must be synchronized to assure the overall synchrony of the $T_1$ system. The repeaters in question utilize transitions between "1" and "0" bits to maintain synchrony. As a result, a long sequences of "0" bits are to be avoided. By adding one "1" per byte, each office channel unit assures that the minimum density of "1" bits is always present. As noted above, the data rate of a $T_1$ channel is 64K bits/sec. The added "1" bit transmitted with each 7 bits of frame data brings the 56K bits/sec loop speed up to 64K bits/sec which exactly matches the capacity of a $T_1$ channel.

When the loop speed is less than 56K bits/sec, i.e., 28K bits/sec, 14K bits/sec, 7K bits/sec or 3.5K bits/sec, the $T_1$ channel is capable of transmitting more data than the telephone system computer network is receiving. In a computer network utilizing the present invention, this added capacity may be utilized for error correction by repetitively transmitting each data byte. The additional copies of the byte are transmitted in successive $T_1$ frames immediately after the $T_1$ frame containing the first copy. When the loop speed is 14K bits/sec, each byte is transmitted four times in successive $T_1$ frames, and so on.

Adaptive office channel unit 78 also receives data from the $T_1$ channel connected thereto on line 99. When two copies of the transmitted byte are received by an adaptive office channel unit 78, the unit checks for errors by noting disagreement between the two bytes, and one of the bytes is selected for output. If the number of copies of each byte is greater than two, an adaptive office channel unit 84 receiving the data on the $T_1$ channel can correct for some errors that occur on a channel level, i.e., during transmission of the bytes between network units which communicate on the $T_1$ communication links. Such network units utilize conventional majority decision algorithms in addition to detecting and reporting errors. If only two copies of the transmitted bytes are present, and the copies are not identical, the receiving adaptive office channel unit 78 only notes an error. Errors which are detected using the 5 ECC/CRC bits are also noted by adaptive office channel unit 78. As will be explained below, such error information may be accessed from the adaptive digital service units to aid in diagnosing system failures and taking corrective measures.

When "$T_1$ formatted" data bytes are received in an adaptive office channel unit, the added "1" bit is stripped and the original frame is reconstructed. This frame is transmitted to adaptive digital service unit 72 on subscriber loop 80. Those errors which may be corrected using the above mentioned majority decision algorithm are corrected; however, no attempt is made to correct errors in user data utilizing the 5 error correcting bits included in each element 73. Rather, errors which may be so corrected are corrected by adaptive digital service unit 72 when it receives the frame.

Upon receiving a frame, adaptive digital service unit 72 unpacks the frame elements 73 and corrects for any errors which can be corrected using the 5 error correcting bits. Adaptive digital service unit 72 then separates the user data from the command data. The user data is then transmitted to computer 70 on serial communication link 74. Any commands intended for adaptive digital service unit 72 are executed by adaptive digital service unit 72.

The adaptive digital service unit which is connected to the master computer in the user's computer network will be referred to herein as the master adaptive digital service unit. The adaptive digital service units connected to the slave computers in the user's computer network will be referred to as the slave adaptive digital service units. If a slave adaptive digital service unit notes errors, it keeps track of these errors. If the error rate exceeds a predetermined threshold value, the slave adaptive digital service unit in question reports an error condition to the master adaptive digital service unit using one of the commands transmitted in field 92 of the loop frame.

If the adaptive digital service unit is a master adaptive digital service unit, it may send commands to the process and control circuits in the telephone system computer network which cause the speed of the computer network to be reduced. These commands are also sent in field 92. By reducing the speed of the telephone system computer network, error rates may be significantly reduced for two reasons. First, reducing the speed at which subscriber loops 80 and 82 operate substantially reduces the error rates on these communication links. Second, as noted above, majority decision algorithms may be used to correct $T_1$ channel-level errors on the $T_1$ communication links at lower data rates.

As noted above, the present invention also supports a communication mode in which user data is transmitted at 64K bits/sec. Such high speed data transfer capabilities are increasingly sought in order to implement high speed computer networks. Since the effective bandwidth of subscriber loops 80 and 82 does not permit data transfer at rates greater than 72K bits/sec, there is insufficient bandwidth to permit data transfer using the loop frame format described above. As a result, error checking and correction on the subscriber loop links is not available in this communication mode. Error detection and correction may be, however, provided on the data paths utilizing $T_1$ communication links.

When operating in the unframed format 64K bits/sec communication mode, adaptive digital service unit 72 receives 8-bit data bytes from computer 70 and transmits data in 9-bit words on subscriber loop 82. Each 9-bit word consists of the 8 bits transmitted by computer 70 and a "1". The added "1" is utilized for maintaining synchrony on subscriber loops 80 and 82. Upon receipt by adaptive office channel unit 78, the added "1" is stripped, and the 8-bit data byte is then transmitted using an error correcting code to correct for transmission errors on the $T_1$ communication links.

As noted above, the $T_1$ communication links were originally designed for carrying voice quality data. As a result, the transmission error rates over these communication links is often too great to allow satisfactory transmission of computer data. To reduce the effective error rates on the $T_1$ communication links, both of the $T_1$ channels mentioned above are utilized together with an error correcting code. At lower transmission speeds, such error correction is not so critical, since the insertion of error codes and error correction utilizing these codes are performed by the adaptive digital service units. However, additional error correction may still be desirable. At the 64K bits/sec data rate, these adaptive digital service unit functions are not available; hence, this added error correction is almost always needed.

Conventional error correcting codes are well known in the computer and telephone arts. Hence, these codes will not be discussed in detail here. For the purposes of this discussion, an error correcting code will be defined as a transformation of a D-bit data word to an encrypted Q-bit data word where $Q>D$ and wherein the transformation which decrypts the Q-bit encrypted data word corrects for errors resulting from alterations resulting from as many as N bits being picked or dropped in transmission over the $T_1$ communication links. Here, N is a function of the particular code chosen. In general, codes having higher ratios of Q to D have higher N values.

In the present invention, D is preferably equal to 8; hence, Q must be greater than 8. As noted above, a single $T_1$ channel provides a 64K bits/sec data communication facility. Since the user data is arriving at adaptive office channel unit 78 at 64 K bits/sec in the unframed mode, and since more than 8 bits must be sent for each 8 bits received, it follows that more than one $T_1$ slot must be utilized. As noted above, each adaptive office channel unit 78 is connected to two slots in the $T_1$ channel bank. The above discussion assumed that only one of these slots is utilized. When additional error correction on the $T_1$ communication links is desired, e.g., at the 64K bits/sec data rate, both slots are utilized. Since two $T_1$ channels are utilized, the optimum value for Q is 16. Hence, the present invention utilizes a 16-bit error correcting code. That is, each 8-bit user data word is encrypted to form a 16-bit encrypted word which is then divided into two 8-bit transmission words, one such transmission word being transmitted over each of the two $T_1$ channels coupled to adaptive office channel unit 78.

Similarly, adaptive office channel unit 78 receives two data words from the incoming channels of the channel bank and converts those two words to a 16-bit encrypted word which is then decrypted to form an 8-bit data word which is used to generate the data transmitted on subscriber loop 80. If the computer network is operating in the framed mode, the added one is stripped from the 8-bit data word. If the computer network is operating in the unframed mode, a "1" is added.

In addition to the properties mentioned above, the error correcting code used for correcting errors on the $T_1$ communication links preferably includes one additional property. As noted above, the $T_1$ communication links include repeaters which enable the signals thereon to be transmitted over long distances These repeaters must remain synchronized. The synchronization is accomplished by observing transitions between "1" and "0" bits on the communication links. Hence, a minimum density of "1" bits is needed. At lower transmission rates, this density was provided by sending 7 data bits and a "1" in each $T_1$ channel. At 64K bits/sec, this solution is not possible, since there is insufficient bandwidth on the $T_1$ lines to transmit the additional "1". As a result, the preferred error correcting code is one which guarantees that each of the 8-bit transmission words has at least one "1".

The preferred error correcting code used in the adaptive multijunction differs from conventional error correcting codes which do not provide at least one "1" in each 8-bit transmission word. In conventional error correcting codes at least one of the transmission words is 0 for some value of the 8-bit user data word. As a result, conventional error correcting codes are unsatisfactory for use in the 64K bits/sec mode of a computer network according to the present invention. The preferred error correcting code is, however, derived from a conventional error correcting code by a transformation which is easily implemented in electronic circuitry and which preserves the full error correcting capability of the conventional error correcting code.

When the $T_1$ error correcting features is operative, an 8-bit data word which is to be sent over a $T_1$ communication link is encrypted as follows. First, the 8-bit user data word is encrypted with a conventional cyclic error correcting code shown in Table II to form two encrypted 8-bit words $^1X$ and $^2X$. The error correcting code shown in Table II is a conventional (16, 8) BCH code in which the 16-bit encrypted data word has been broken into two 8-bit data words.

The present invention transmits two transmission data words $^1Y$ and $^2Y$ in place of $^1X$ and $^2X$. $^1Y$ and $^2Y$ are derived from $^1X$ and $^2X$ by performing a transformation of $^1X$ and $^2X$ to arrive at $^1Y$ and $^2Y$. The transformation in question operates by exchanging the data invarious bit positions and by complementing the data in specified bit positions prior to said data being exchanged. This is illustrated in Table II by the labels over the various bit positions in $^1X$, $^2X$, $^1Y$, and $^2Y$. The bit positions in $^1X$ are labeled "1" through "8". The bit positions in $^2X$ are labeled "A" through "H". The data used to generate $^1Y$ and $^2Y$ is shown over the columns labeled $^1Y$ and $^2Y$. For example, the first bit of $^1Y$ is obtained by copying the data in the first bit position of $^1X$. The second bit of $^1Y$ is obtained by copying the data in the second bit position of $^1X$. And, the eighth bit of $^1Y$ is obtained by copying the data in the seventh bit position of $^2X$ and complementing said data, as indicated by the bar over the letter G.

This method for generating the transmission words, $^1Y$ and $^2Y$, is preferred because conventional circuitry for generating $^1X$ and $^2X$ from a user data word x using a BCH code is inexpensive and readily available. The above described transformation is also easily implemented since it can be carried out by placing $^1X$ and $^2X$ in a first set of registers and then copying the data to a second set of registers and then connecting the corresponding bit positions by conducting paths. For those bit positions in which the data is to be complemented, inverters are placed in the conducting paths in questions.

Similarly, the decryption process may advantageously utilize conventional circuitry for decrypting the BCH code in question. The transmission data words are placed in a first set of registers. The data in these registers in then copied into a second set of registers by connecting corresponding bit positions by conducting paths which include inverters in selected paths. The data in the second set of registers is then decrypted using the conventional BCH hardware.

It should be noted that the transformation in question begins and ends with the conventional BCH code. Hence, it has the same error detecting and correcting capabilities as the conventional code.

Having provided the above discussion of the basic elements of a computer network adapted for utilizing an adaptive multijunction unit according to the present invention, a more detailed description of such an adaptive multijunction unit will now be given. As noted with reference to FIG. 2, an adaptive multijunction unit according to the present invention preferably operates on data which is coupled thereto on a single $T_1$ communication link. This data is coupled to the present invention through a conventional channel bank of the type described above with reference to an adaptive office control unit.

Figure 4:
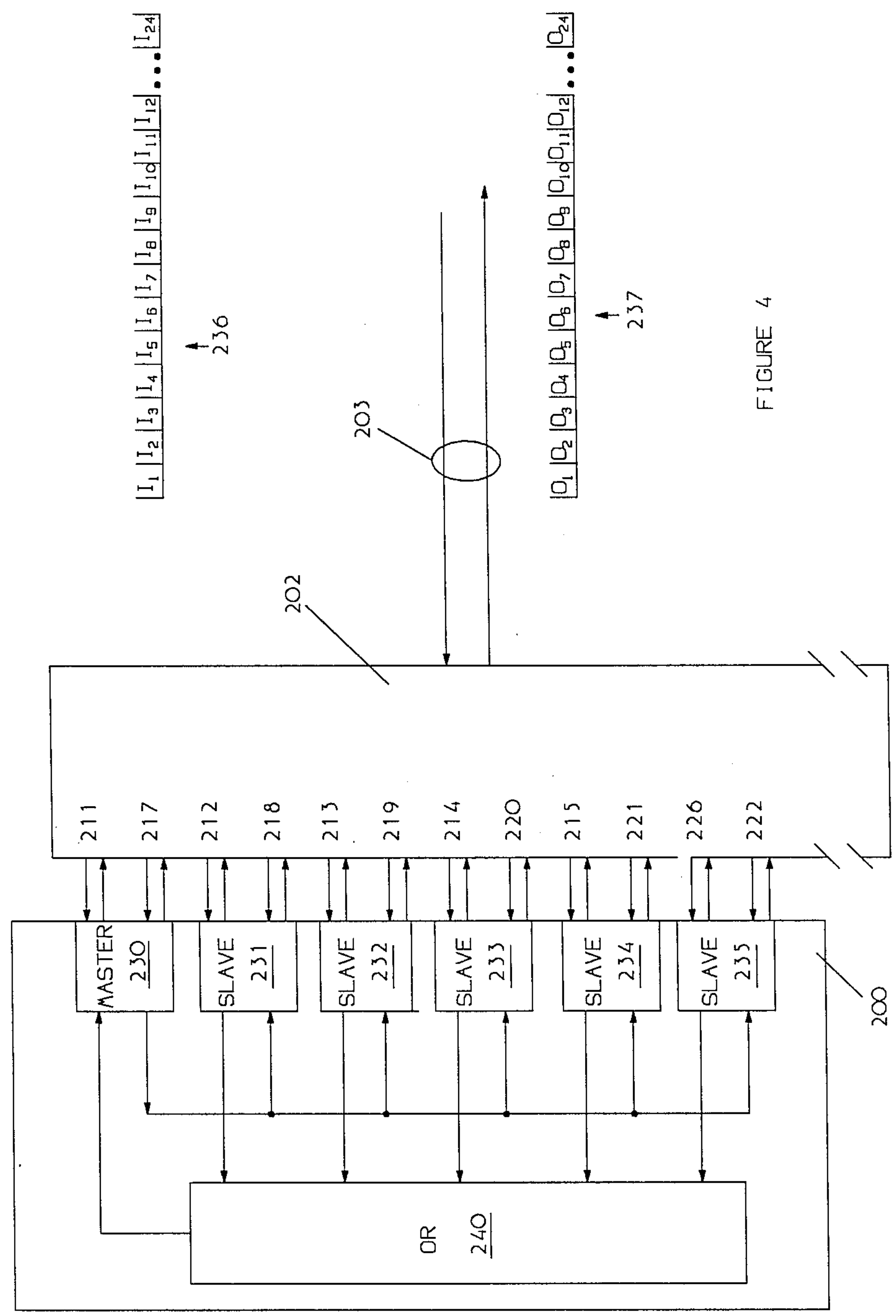
FIG. 4 is a block diagram of an adaptive multijunction unit according to the present invention.

FIG. 4 illustrates the manner in which an adaptive multijunction unit 200 according to the present invention is coupled to a $T_1$ communication link 203 via a channel bank 202. A $T_1$ input frame to channel bank 202 is shown at 236 and a $T_1$ output frame leaving channel bank 202 on $T_1$ communication link 203 is shown at 237. Each $T_1$ frame consists of 24 bytes. The bytes in the $T_1$ input frame are labeled $I_1$ through $I_{24}$, and the bytes in the $T_1$ output frame are labeled $O_1$ through $O_{24}$.

In the preferred embodiment of the present invention, adaptive multijunction unit 200 occupies 12 slots in channel bank 202 and provides one master port 230 and 5 slave ports 231–235. The 12 slots in question are labeled 211–222 in FIG. 4. For simplicity, it will be assumed that slots 211–222 receive data bytes $I_1$ through $I_{12}$, respectively, in $T_1$ frame 236 and transmit data bytes $O_1$ through $O_{12}$, respectively, in $T_1$ frame 237. When the error correcting channel described above is not enabled, adaptive multijunction unit 200 utilizes 6 slots in channel bank 202 to perform these functions. These slots are labeled 211–216 in the figure. The remaining 6 slots labeled 217–222 are reserved for use as error correcting channels. If the error correcting channels are not utilized by a given computer network, these 6 additional slots and the $T_1$ channels served thereby may be utilized by other systems in the telephone system.

In error correcting mode of operation, the data input to master port 230, i.e., data bytes $I_1$ and $I_7$are error corrected and then copied to each of the slave ports 231–235 which output the data bytes in the corresponding channels of frame 237. Hence, $$O_2=O_3=O_4=O_5=O_6=I_1,$$

and $$O_8=O_9=O_{10}=O_{11}=O_{12}=I_7.$$

In the non-error corrected mode, data bytes from $I_1$ entering through slot 230 are copied to slave ports 231–235 and outputted as as $O_2$ through $O_6$.

The manner in which data input from the slave ports 231–235 to master port 230 is handled is somewhat more complicated and depends on the mode in which the telephone system computer network is operating. To simplify this discussion, the case in which the error correcting channels are not utilized will be described first. In this case, the master port and the slave ports each utilize one $T_1$ channel. Each slave port receives one byte of data on the input side of $T_1$ communication link 203. Slave port 231 receives byte $I_2$, slave port 232 receives byte $I_3$, and so on. These data bytes are combined by ORing the corresponding bits in each said byte to form the output byte, $O_1$, which is transmitted by master port 230.

For the purposes of the following discussion, it will be assumed that the telephone system computer network is operating in the framed mode, i.e., at a transmission rate below 64K bits/sec. In this case, the individual data bytes in question consist of 7 "data" bits plus a "1". The seven data bits in question are derived from either one of the elements 73 described above or from the 16-bit data block 75. The data in the elements in question consists of either command data, user data, error correcting bits, or "1" bits in fixed locations. Since the individual bytes received are ORed together, only one of the slave computers in the computer network may communicate with the master computer at any given time. To avoid data collision, the remaining slave computers must transmit all nulls for their data when these slave computers are not enabled by the master computer. Here, a null is defined to be a bit which when ORed with a non-null results in an output of the non-null.

As will be explained below, when a slave computer is not enabled, it sends a frame containing nulls in all of the relevant bit positions. The bit used for the null bit will depend on whether the OR logic is positive or negative. In a positive logic embodiment, the null bit would be a zero. In a negative logic embodiment, the null character is a one, and the OR operation is a negative OR. The preferred embodiment of the present invention utilizes negative logic, since all zeros are to be avoided.

Since the data streams from the inactive computers which are being combined contain either the same bits as those from the active computer, i.e., sychronization data, or nulls, the data stream resulting from ORing the data on all of the slave channels is the same as the data stream from the active computer.

If the telephone system computer network is operating at 64K bits/sec without the error correcting channels being enabled, the adaptive multijunction units still function properly. In this case, each of the non-selected computers in the user's computer network will be transmitting bytes which are all nulls. Hence, only the byte from the selected computer will be non-null. As a result, the byte obtained by ORing all of the user data bytes will have a value equal to that of the byte transmitted by the selected computer.

When the error correcting channels are enabled, the OR operation is more complicated for two reasons. First, the data is transmitted on two $T_1$ channels. Second, the error correcting code utilized on the $T_1$ lines can interfere with the data ORing operation if the encrypted data words in the $T_1$ channels are merely ORed together. The manner in which this interference is generated may be most easily understood with reference to a system in which the inactive slave computers transmit all zeros, i.e., positive logic is used.

For example, assume that slave computer 34 shown in FIG. 2 is enabled and that slave computer 36 is not. Furthermore, assume that the error correcting channels are enabled. In this case, slave computer 36 will be sending 8-bit bytes that are 0 at 64K bits/sec to the adaptive digital service unit 40 connected to it. This adaptive digital service unit adds a "1" bit in the 9th bit position and transmits the resultant 9-bit word on subscriber loop 47 to adaptive office control unit 52 which strips the 9th bit and encrypts each of these 0 words into two 8-bit transmission words having binary values of 00000011 and 00000011. These transmission words are then sent on two $T_1$ channels in $T_1$ communication link 63 to adaptive multijunction unit 69. For the purposes of this discussion, these channels will be referred to as channels 63*a* and 63*b*, respectively.

Assume that slave computer 34 sends a data word consisting of a byte having the decimal value 100 to the adaptive digital service unit 40 connected to it. This data word will be encrypted to two transmission words having the values of 00010000 and 10101011 which will reach adaptive multijunction unit 69 on two $T_1$ channels in $T_1$ communication link 63. For the purposes of this discussion, these channels will be referred to as channels 63*c* and 63*d*, respectively.

Adaptive multijunction unit 69 must function such that the resulting data words on the two channels, referred to as 63*e* and 63*f*, assigned to the master computer 32 on $T_1$ will contain the transmission words 00010000 and 10101011. If adaptive multijunction unit 69 ORs the bit patterns on channels 63*a* and 63*c* to form the bit pattern on channel 63*e* the result would be 00010011. Similarly, if adaptive multijunction unit 69 ORs the bit patterns on channels 63*b* and 63*d* to form the bit pattern on channel 63*f*, the result would be 10101011. When these two transmission words are decrypted by an adaptive office control unit for transmission back to a computer in the user's computer network, a transmission error will be indicated, since no value of x can properly give rise to ${}^1Y=00010011$ and ${}^2Y=10101011$.

This problem is overcome in the present invention by including encrypting and decrypting circuitry in each slave port. This circuitry is utilized when the error correcting channels are enabled. As described above, adaptive multijunction unit 200 shown in FIG. 4 is preferably connected to 12 channels in channel bank 202. The additional slots in channel bank 202 are slots 217–222. The input to each pair of channels is decrypted using decrypting circuitry such as that shown in FIG. 4. For example, when input data bytes $I_2$ and $I_8$ are received by slave port 231, these bytes are decrypted to form a single 8-bit data word which is communicated to OR circuit 240. Similarly, slave port 232 decrypts the two input data bytes $I_3$ and $I_9$ and sends the resulting 8-bit data word to OR circuit 240, and so on. OR circuit 240 ORs the individual data words in question and then encrypts the resulting data words. The encryption process produces two 8-bit data words which are transmitted to channel bank slots 211 and 217, respectively.

The above description of the adaptive multijunction units has referred to ORing the corresponding data words. It will be apparent to those skilled in the art that this ORing operation has the effect of ORing the frames 84 input from each slave computer.

Figure 5:
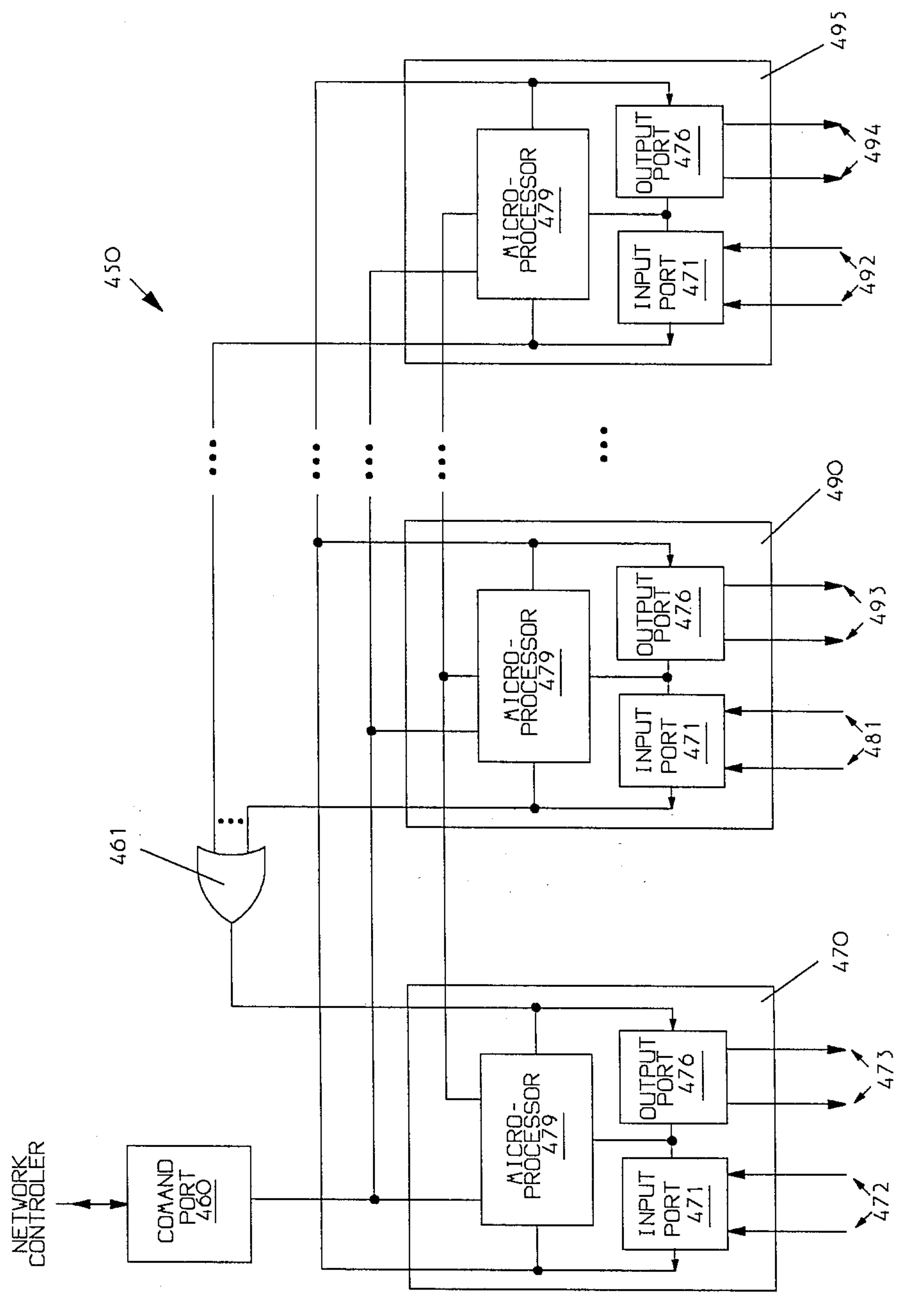
FIG. 5 is a more detailed block diagram of an adaptive multijunction unit according to the present invention.

A more detailed block diagram of the preferred embodiment of an adaptive multijunction unit according to the present invention is shown in FIG. 5 at 455. Adaptive multijunction unit 455 includes a master data port 470 and a plurality of slave data ports of which slave data ports 490 and 495 are typical. The remaining slave data ports have been omitted from the figure for clarity. Each data port receives data on either one or two incoming lines and transmits data on either one or two outgoing lines. The number of lines used depends on whether or not the error correcting channel is operative. The incoming lines to master data port 470 are shown at 472, and the incoming lines for slave data ports 490 and 495 are shown at 491 and 492, respectively. Similarly, the outgoing lines from master data port 470 are shown at 473, and the outgoing lines from slave data ports 490 and 495 are shown at 493 and 494, respectively. Each pair of input and output lines is preferably connected to a slot in a conventional channel bank.

Each data port includes an input port 471 which is coupled to the incoming lines, an output port 476 which is coupled to the outgoing lines, and a microprocessor 479 which controls the operations of the data port in question. Data input to master data port 470 through its input port 471 is copied to the output ports 476 in each of the slave data ports. Data which is input to the input ports 471 in each of the slave data ports is combined by an OR circuit 461 whose output is connected to the output port of master data port 470.

Adaptive multijunction unit 455 also includes a command port 460 which is used to connect adaptive multijunction unit 455 to a network control computer which may be used to insert commands into the data streams flowing through adaptive multijunction unit 455 or to read data flowing in said streams. The use of such inserted commands will be discussed in more detail below. For the purpose of this discussion it should be noted that commands inserted through command port 460 are copied to each of the microprocessors 479. If the command is addressed to the data port in which the microprocessor is located, the microprocessor in question causes the command to be executed. If the command is not to be executed by the microprocessor in question, it is merely outputted by the microprocessor on its output port. Commands not intended for the adaptive multijunction unit are copied in both the "upstream" and "downstream" directions to the other network units connected to the adaptive multijunction unit. Here "upstream" refers to data leaving the master data port of an adaptive multijunction unit.

All of the microprocessors 479 are connected together by a bus 456. As will be explained in more detail below, there is one function that requires coordination between the various microprocessors. This bus is utilized to provide the communication needed to provided that coordination.

Figure 6:
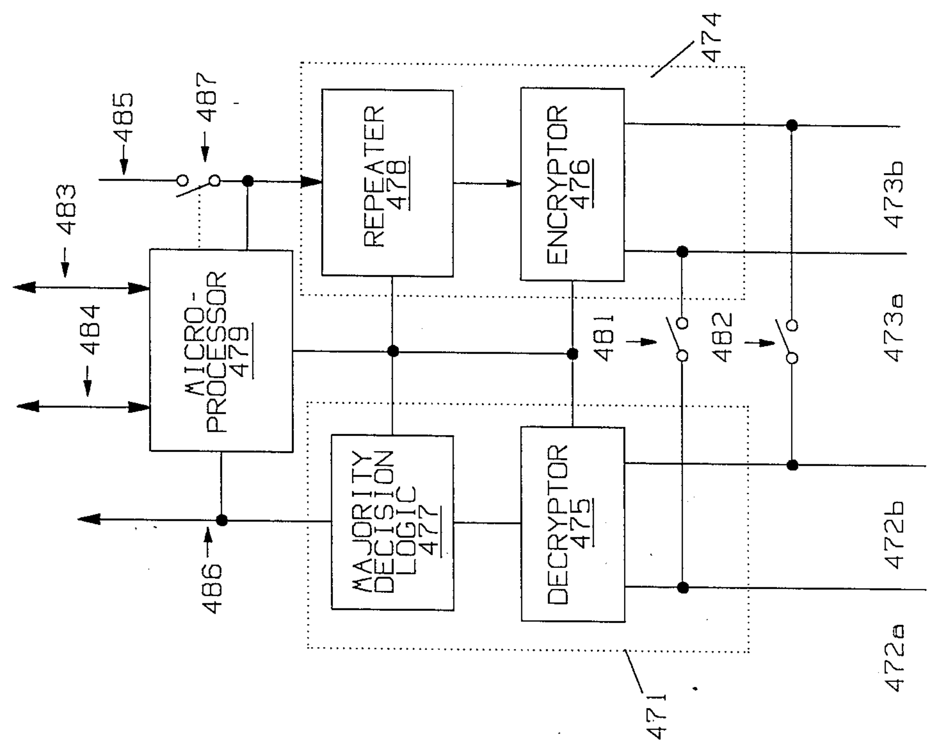
FIG. 6 is a block diagram of the master data port of the preferred embodiment of the adaptive multijunction unit shown in FIG. 5.

Structurally, all of the data ports, including master data port 470, are identical. Hence, the functioning of the various data ports will be described with reference to master data port 470. A more detailed block diagram of master data port 470 is shown in FIG. 6. Master data port 470 includes an input port 475. Input port 475 is connected to two incoming lines 472*a* and 472*b* which are used to receive bytes of data from the primary and secondary channels connected thereto. As noted above, the use of the error correcting feature of the present invention is optional. If the error correcting feature is enabled, data is received on both of lines 472*a* and 472*b*. If this feature is disabled, data is received only on line 472*a*.

Input lines 472*a* and 472*b* are connected to a decryptor 475 which is used to decrypt the error encrypted data present on lines 472*a* and 472*b* when the error correcting feature is operative. Decryptor 475 operates on two bytes of data, one being received on line 472*a* and the other being received on line 472*b*, to generate a single error corrected byte which is outputted from decryptor 475. When the error correcting feature is inoperative, decryptor 475 merely copies each byte received on line 472*a* to the output of decryptor 475.

As noted above, when the computer network is transmitting data at rates below 38.4K bits/sec, each byte (i.e., a 7-bit frame segment together with an added "1") is repeated a number of times on the $T_1$ communication link in successive $T_1$ frames, the number of repeats being a function of the data transmission rate. These repeated bytes are combined to form a further corrected byte using majority decision logic by majority decision circuit 477 which receives the bytes outputted from decryptor 475.

Similarly, master data port 470 includes an output port 474 which is connected to two outgoing lines 473*a* and 473*b* which are used to transmit bytes of data to the primary and secondary channels connected thereto. Output port 476 receives its data from a repeater 478 which repeats each byte of data input thereto a predetermined number of times, the number depending on the data transmission rate of the computer network. Each byte generated by repeater 478 is transmitted to an encryptor 476 which is connected to output lines 473*a* and 473*b*. If the error correcting channel is operative, encryptor 478 encrypts each byte input thereto using the error correcting code described above and transmits the two bytes so generated on output lines 473*a* and 473*b*. If the error correcting channel is not operative, encryptor 476 merely copies each byte input thereto to output line 473*a*.

Figure 7A:
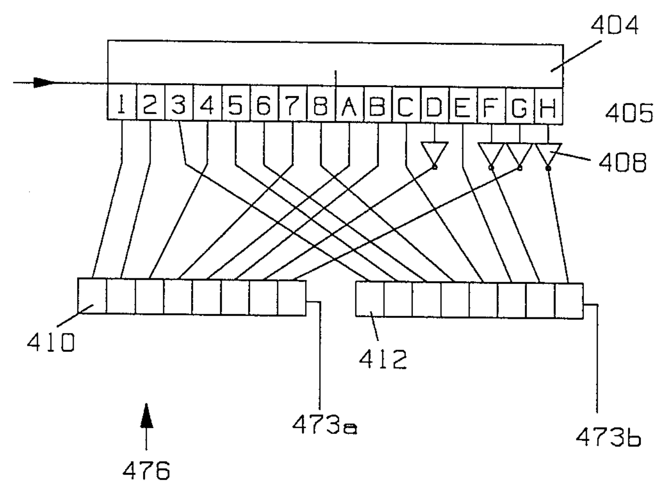
FIG. 7(*a*) is a block diagram of an encryption circuit utilized in the preferred embodiment of the present invention.
Figure 7B:
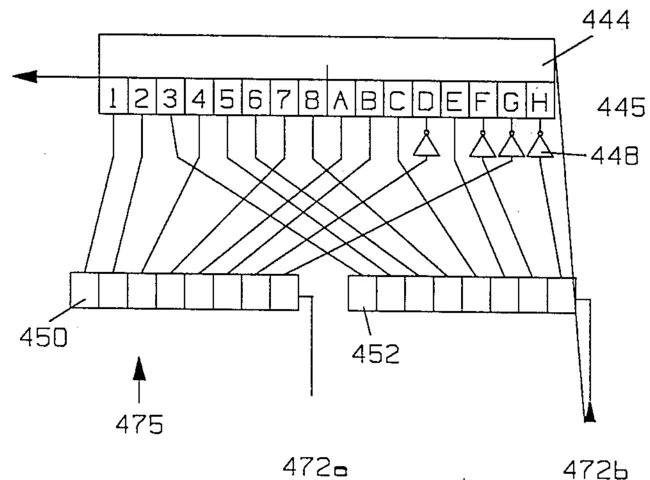

A block diagram of the preferred embodiment of error code encryption circuit 476 according to the present invention is shown in in FIG.7(*a*). The error code used by this circuit is given in Table II.

A data byte received from repeater 478 on line 402 is loaded into cyclic code generating circuit 404 which converts each 8-bit data word into a 16-bit encrypted word which is stored in a 16-bit register 405. The individual bits of register 405 are labeled 1 through 8 and A through H. These two 8-bit data words correspond to $^1X$ and $^2X$ shown in Table II. The 16-bit encrypted word stored in register 405 is transformed into two transmission words by connecting each bit in register 405 to a corresponding bit in one of two shift register 410 and 412. These two transmission words correspond to $^1Y$ and $^2Y$ shown in Table II. Those bit positions in register 405 that are to be complemented are connected to the corresponding bit positions in the shift registers through inverters of which inverter 408 is typical. These connections form a hardwired transformation of the conventional error correcting code to an error correcting code according to the present invention. The transformed error correcting code is then shifted out onto lines 473*a* and 473*b*.

A block diagram of decryptor 475 is shown in FIG. 7(*b*). The two encrypted bytes received on lines 472*a* and 472*b* and loaded into registers 450 and 452. The data in these registers is transferred to a 16-bit register 445 in a cyclic code decoding circuit 444. The data in question is transferred by connecting the individual bits of shift registers 450 and 452 to register 445 such that the inverse of the transformation between register 405 and shift registers 410 and 412 is performed. Once loaded, the contents of register 445 are decoded using the conventional cyclic code decoding circuitry. The resulting 8-bit data word is then outputted to majority decision logic circuit 477.

Referring again to FIG. 6, a switch 487 which is under the control of microprocessor 479 is present in the input line to repeater 478. When microprocessor 479 needs to insert a command into the data stream passing through the data port, this switch is utilized to interrupt the flow of data so that microprocessor 479 may introduce new data into the next frame transmitted from the data port.

As will be discussed in more detail below, the present invention includes provisions for setting loopbacks for use in diagnosing network malfunctions. Switches 481 and 482 which are also under the control of microprocessor 479 are utilized to set these loopbacks. When closed, switch 481 causes all data input on line 472*a* to be outputted on line 473*a*. Switch 482 operates in a like manner.

Microprocessor 479 monitors the data leaving majority decision circuit 479. When the computer network is transmitting data in a framed format, microprocessor 479 reconstructs each frame received on input lines 472*a* and 472*b* from the individual bytes of data. It records errors detected using the error correcting data in each frame; however, it makes no attempt to correct errors using the ECC bits. Finally, it examines the command data in each frame to determine if the command data contains a command directed to it. If such a command is present, it executes the command.

If the computer network is operating in the 64K bits/-sec mode in which data is not transmitted in frames, microprocessor 479 merely examines successive bytes of data in search of a predetermined sequence of bytes which is used to instruct it to switch to the framed transmission mode.

Microprocessor 479 can also transmit commands including data specifying its current status and observed error rates. Such transmissions are made in response to commands which are either received in a frame from another network unit or inputted from command port 460. These commands are transmitted in the command data of the next frame transmitted by master port 470, by replacing the command data in that frame with the command and data in question. As noted above, switch 480 may be utilized to perform this replacement prior to the data being inputted to repeater 478.

Although the various microprocessors in the slave data ports of adaptive multijunction unit 455 typically act independently of each other in terms of executing commands and inserting new command data into frames transmitted thereby, the microprocessors must synchronize their actions with reference transmitting data to OR circuit 461. There may be substantial differences in the distances between the adaptive digital service units which transmit data to the various slave data ports and the adaptive multijunction unit. Hence, even if all frames leave adaptive digital service units at the same time, they may not arrive at the adaptive multijunction unit at the same time. Such differences in arrival times could cause problems in the framed data mode, since it could result in different fields in the various frames being ORed together.

Consider the case in which one of the frames were delayed by a time equal the difference in time between two bits in a frame. If the bits of this frame were ORed with the bits of the other frames as the various bits arrived at the adaptive multijunction unit, a "1" bit used for synchronization purposes in a frame from an inactive channel could be ORed with the non-synchronization bits of the address field of the frame from the active channel thereby causing a transmission error.

This situation is avoided in the preferred embodiment of an adaptive multijunction unit according to the present invention by including a FIFO buffer in each of the input ports 471. The incoming frames are stored in this FIFO buffer. The data is not read out of the FIFO buffer to OR circuit 461 until all of the microprocessors in the slave data ports have detected the Barker synchronization sequence which begins each frame.

It should be noted that these synchronization problems are not present in the unframed data mode, since each inactive channel is sending all nulls. That is, the data which is ORed together consists of the data from the one active channel and all nulls in the other channels.

As noted above, all of the network units in the telephone system portion of the computer network have assigned addresses which are used in directing commands to the various units. In the case of an adaptive multijunction unit according to the present invention, there are actually 6 addresses corresponding to the 6 data ports theron. Five of these addresses are set with reference to the sixth address which is the address of the master data port. The addresses of the slave data ports are preferably equal to that of the master data port plus a constant which depends on the slave data port number. Hence, if the master data port is assigned an address of 100, slave data ports would assume address of 101, 102, and so on.

As noted above, the combining functions of a multijunction unit in a computer network have the potential for introducing transmission errors into the data stream sent to the master computer. For example, consider the case in which noise is present on the subscriber loops connecting the various slave computers to the adaptive office control units connected thereto. This noise will introduce errors into the various frames from the inactive computers thereby converting frames which should contain all nulls into frames which contain non-null bits in critical locations. When such erroneous data streams from the inactive computers are combined with the data stream from the active computer, the resultant data stream will include the transmission errors from the inactive computers. This problem increases in severity as the number of slave computers in the computer network increases, since the probability of a transmission error in at least one of the non-selected data links increases with number of such data links.

In this regard, it should be noted that the number of slave computers in the computer network may be much larger than the number of slave data ports on a single adaptive multijunction unit. In large computer systems, a number of adaptive multijunction units may be cascaded. That is, the output of the master data port of one adaptive multijunction unit may be connected to the input of a slave data port in another adaptive multijunction unit.

Furthermore, if these errors occur because of noise on the subscriber loops, they are not corrected before reaching the adaptive multijunction unit. In principle, errors resulting from noise on the $T_1$ communication links can be significantly reduced by the above described error correcting codes which are utilized at the ends of the various $T_1$ communication links. However, errors resulting from noise on subscriber loops are only corrected upon reaching the far end adaptive digital service unit. Hence, these errors will be present at the adaptive multijunction unit.

The preferred embodiment of the present invention utilizes two commands, referred to ACTIVATE and DEACTIVATE to substantially reduce such errors. As noted above, the user's computer equipment is connected to an adaptive digital service unit via a standard RS-232 interface. The adaptive digital service unit tracks the on and off states of the CTS signal from the user's computing equipment. When the CTS is turned off (no data to send), the adaptive digital service unit sends a frame with all nulls for the user data and a DEACTIVATE command in the command portion of the frame. When the CTS is turned on, the adaptive digital service unit sends a frame with an ACTIVATE command in the command portion of the frame.

When the input port of a slave port of an adaptive multijunction unit according to present invention receives a DEACTIVATE command, it places all nulls on its internal signal bus for the slave port in question. Furthermore, if the microprocessor in the master port of the adaptive multijunction unit detects that all legs are so deactivated, it constructs an outgoing frame which also consists of all ones and a DEACTIVATE command. Hence, for noise to get through an adaptive multijunction unit in normal synchronization mode, it must duplicate an ACTIVATE command which is highly unlikely.

As noted above, the adaptive digital service units, adaptive office control units, and adaptive multijunction units are all capable of executing a number of commands that are useful in setting the data transmission mode and data transmission rate, and in diagnosing errors in the computer network. By utilizing these commands, the computer network user can control key features of the network and can diagnose problems without the intervention of telephone company personnel. By restricting the commands that may be executed by the computer network user, the telephone company can restrict the user to prearranged data rates and services. This provides the telephone company with the ability to market more restrictive network capabilities at lower user rates. The manner in which system commands are restricted will be described in more detail below.

When operating in the framed mode, an adaptive multijunction unit according to the present invention unpacks the data in a frame 84 received thereby by detecting the beginning of the frame using the synchronization data described with reference to field 91 of loop frame 90. The frame is unpacked by the microprocessor in the data port receiving the frame. The microprocessor extracts the command and address data. Some of the commands utilize other data fields of loop frame 90 to communicate further data needed by the command. If the command in question utilizes this additional data, the data in the fields in question is also extracted. Some of these commands may not be given when the user is transmitting data on the computer network, since the commands utilize the fields reserved for user data.

Each port includes a register, preferably included in the microprocessor, for storing an address identifying the data port in question. As noted above, the addresses of the various slave data ports are related to the address of the master data port; hence when the master data port is assigned an address, the address of the various slave data ports are automatically set. When a command is received by a data port, the microprocessor therein checks the address specified in the received frame 84 to determine if the command is to be executed by the data port in question.

The microprocessor in each data port also generates command data in response to a received command. This data is inserted in the command data fields in the next frame transmitted by the data port. As noted above, the adaptive multijunction unit also includes a command port which provides a means for telephone service technicians to insert commands in the telephone system computer network.

The various commands executed by the adaptive multijunction unit and their functions will now be described.

Secure Commands

The present invention provides a security mechanism to insure that network commands that originated from an adaptive digital service unit are restricted such that a user cannot use an option that is not subscribed or change the network configuration in a manner which might introduce problems into the telephone system. The mechanism in question utilizes the first bit in field 95 which is referred to as the security bit. When this bit is a "1", the adaptive office control units and adaptive multijunction units are restricted from executing the commands specified in field 92 of the loop frame. To assure that a user can not set the security bit to a "0", the adaptive office control units force this bit to a "1" when the adaptive digital service unit blocked data is passed through an adaptive office control unit. Secure commands, i.e., those which require a security bit of "0", can only be sent from internal devices (adaptive office control units and adaptive multijunction units) in the telephone system computer network. Whenever an internal device receives a command from its system control port, the device sets the security bit to "0" for the frame containing the command in question.

If an adaptive digital service unit inserts a secure command into a loop frame in response to commands on its system control port, the internal devices in the telephone system computer network will not execute the command, since even if the adaptive digital service unit changes the security bit to a "0", the adaptive office control unit receiving the loop frame information forces the security bit to a "1". However, an adaptive digital service unit receiving a secure command will execute the command, since adaptive digital service units do not check the security bit. Hence, the user can always check the observed data rates through the entire system, since this information is available from the far end adaptive digital service unit.

Examples of secure commands are commands that reset the internal devices in the telephone system, commands that enable the 64K bits/sec transmission mode, and commands that enable a second group of commands that are referred to as conditionally secure commands. If a user wishes to utilize the conditionally secure commands, the user must do so by transmitting the request to the telephone company. A telephone system technician then issues a secure command that enables the commands in question.

Conditionally secure commands are commands that may be enabled for a given network by the telephone company. Once enabled, the user can use these commands. Such commands are useful for restricting service to computer networks that have subscribed to only part of the available computer network services. Examples of such commands are commands that read the status of various internal devices, e.g., adaptive office control units and adaptive multijunction units, commands that place the various internal devices in loopback modes for testing, and commands that reconfigure the adaptive multijunction units for testing purposes. This last group of commands will be discussed in more detail below.

Conditionally secure commands are implemented utilizing the above discussed security bit and a security flag in each network unit. Each network unit has a security flag consisting of a one-bit storage cell. There is one such flag for each feature that may be triggered by a conditionally secure command. If a network unit's security flag for a particular option is set to a "1", the network unit will ignore a conditionally secure command sent to it. If the security flag is a "0", the command will be executed. The security flags of the various network units are set and reset by a set of secure commands. Hence, when a user subscribes to a particular service such as user enabled testing, a secure command enabling the security flag in the relevant internal devices is sent by a telephone company technician.

Rules Governing the Execution of Network Commands

The various network units in a computer network, i.e., the adaptive digital service units, the adaptive multijunction unit, and the adaptive office control units, must remain synchronized for the computer network to operate correctly. To reduce the chance that erroneous commands will cause one or more to the devices to operate in a mode that will destroy this syncrony, the following three rules are observed. First, a network unit ignores all undefined or inappropriate commands. The network unit also ignores any command that might have been modified by a transmission error. If the 5 error correcting bits in the element 73 containing the command indicate that a transmission error has occurred during the transmission of said element, the command is ignored.

Second, the time at which a given command is executed is determined by the microprocessor present in the network unit. The ACTIVATE and DEACTIVATE commands must be executed as soon as possible after the command and address bytes are received. All other commands must wait until the complete frame is received before executing the commands.

Third, all network units, including the adaptive multijunction unit of the present invention, respond to a STATUS command with the address assigned to the unit and the status of unit. This command may be used to verify that a previously sent command was properly executed.

Initialization

Upon being powered up or reset, the adaptive multijunction unit of the present invention assumes a default state in which data is transmitted and received in the framed data mode at a default data rate which is preferably 2.4 K bits/sec. At this point, the adaptive multijunction unit does not have an assigned address. The adaptive multijunction unit may be assigned an address by a command from its command port or by receiving a frame which includes an ADDR_ASSIGN command and an address to be assigned. If the adaptive multijunction unit receives such a frame when it has not yet been assigned an address, it does not pass the frame onto the network units connected to it. Instead, it assumes the address given in the command. As noted above, the address assigned to the adaptive multijunction unit is the address of the master data port. The addresses of the slave data ports are automatically set with reference to this address.

Once the adaptive multijunction unit has acquired an address in this manner, it ignores all other ADDR_ASSIGN commands. That is, it transmits the frames containing the command, since the command is not addressed to it.

When an adaptive multijunction unit is powered up, all of the slave data ports are blocked. That is, the data ports will receive frames; however, they will not transmit the received frames. Each slave data port may be selectively unblocked by sending an UNBLOCK command with the address of the slave data port in question. By selectively unblocking slave ports, ADDR_ASSIGN commands can be selectively propagated to other network units in the telephone system computer network. This type of selective propagation allows each network unit to be assigned its own unique address at any time. This feature of the present invention is particularly useful after the computer network has been reconfigured for some reason.

As noted above, each network unit, including the adaptive multijunction unit, responds to a STATUS command by sending a frame which includes an ACK command and data specifying the unit's type (i.e., adaptive multijunction unit, adaptive digital service unit, or adaptive office control unit), address, and status. Each data port of the adaptive multijunction unit responds independently to a STATUS command. The master data port includes in its response the state, blocked or unblocked, of each of the slave data ports.

It should be noted that, with the exception of the RESET command, all the ADDR_ADDRESS and STATUS commands used can be executed from the command port of any device in the computer network. Hence, a user can ascertain the topology and addresses assigned within the computer network at any time, assuming that the user has been given access to this service, i.e., the security flags in the various devices have been appropriately set. Furthermore, the user can assign his own addresses to the network units within the telephone system computer network if the user so desires. This feature is particularly well suited to users who maintain their own network using software executed from an adaptive digital service unit within the network.

Data Rate Changes

The speed at which data is transferred on the telephone system computer network is determined by SET_RATE commands. Such commands may be generated by a system controller connected to the command port of any device in the computer network or by the adaptive digital service unit connected to the master computer. Since an adaptive multijunction unit operates on data from $T_1$ communication links, the rate at which data is received and transmitted remains the same; however a SET_RATE command has the effect of changing the number of copies of each data byte which are present in the framed data mode. Hence, an adaptive multijunction unit according to the present invention responds to SET_RATE commands by adjusting the number of copies utilized by repeater 478 and majority decision logic 477 shown in FIG. 6.

A separate conditionally secure command is used to change the telephone system computer network to the 64K bits/sec unframed mode. After entering this mode, an adaptive multijunction unit can only execute a single command which causes it to resume operation in the framed data mode. When in the unframed mode, the adaptive multijunction unit scans for the specific sequence of bytes which signal that it should return to the framed data mode.

Synchronization

Since there are a number of possible operating speeds in the telephone system computer network, an adaptive multijunction unit according to the present invention can determine the operating speed of the telephone system computer network and resynchronize with it. The problem of network units operating at different speeds can arise when a network unit receives a SET_RATE that is garbled by noise. Although this problem is primarily encountered when the telephone system computer network is operating in the adaptive mode, i.e., when the operating speed is being set in response to observed error rates, it can also occur in other modes, i.e., when a new adaptive multijunction unit is plugged into the telephone system computer network while the computer network is operating at a fixed rate.

In a computer network utilizing the present invention, this problem is solved as follows. All network units, including the adaptive multijunction units, determine the system rate, i.e., the rate of the master adaptive digital service unit, and adjust themselves to that rate. When a network unit is out of synchronization for a predetermined period of time, it begins a scanning process to determine the system rate. The source of data which the network unit scans in its attempt to determine the system rate depends on the type of network unit and whether the network unit is coupled to the master computer in the computer network. If the device is an adaptive multijunction unit, it continues to pass data as it had before, and after detecting that it does not know the system rate, it searches for the new rate until it resynchronizes using the algorithm described below. The adaptive multijunction unit scans on its master data port to determine the system rate, since this is the most direct connection to the master adaptive digital service unit.

An adaptive multijunction unit detects that it does not know the system rate when it has failed to detect the Barker synchronization code in a predetermined number of bytes. When an adaptive multijunction unit master data port has seen a sufficient number of data bytes to conclude that it should have seen the Barker code if the system speed was correct, it assumes that synchronization has been lost. The number of data bytes searched may differ for different data rates. Typically, this number is at least 3000 bytes in the preferred embodiment of the present invention.

Once the adaptive multijunction unit detects that it does not know the system rate, it performs a search at the various possible system rates until it finds the Barker code at one of them. At each new rate, the adaptive multijunction unit searches for the Barker code. After a predetermined number of bytes have been examined without finding the Barker code, the adaptive multijunction unit selects the next lowest speed and repeats the process. If it is already at the lowest speed, it selects 38.4K bits/sec for the next speed. Hence, the adaptive multijunction unit will continue to cycle through all of the possible data rates until it finds the correct one.

Loopbacks

Each of the network units, including the adaptive multijunction units, in the telephone system computer network includes loopback capabilities in the preferred embodiment of the present invention. When placed in loopback mode, data entering the adaptive multijunction unit on an input line thereto is copied to an output line thereof. The point at which the data is transferred determines the type of loopback. In a "near" loopback, the data entering a data port is copied back to the output line of the data port at the entrance point to the data port in question. That is, the data does not pass through the encryption and decryption circuitry nor the data combining circuitry. For example, a near loopback of master data port 470 shown in FIG. 6 would be accomplished by closing switches 481 and/or 482. In a "far" loopback, the data is copied back at the point at which the data would normally leave the adaptive multijunction unit. For example, a far loopback at a slave data port is accomplished by copying the data from the master data port output port back to the master data port input port. By comparing the response of the adaptive multijunction unit when near and far loopbacks are utilized, malfunctions within the adaptive multijunction unit may be detected. Loopbacks are initiated and canceled by specific system commands similar to those described above.

Command Execution

Referring again to FIG. 6, the microprocessor in each port monitors both the data stream leaving majority decision circuit 477 and the data stream entering repeater 478 to determine if a command intended for the port in question is present on either of the data streams. In addition, new command data may be inserted into repeater 478 if the microprocessor has been instructed to insert a command into the next frame leaving the data port. This guarantees that a command which is received by the master data port, but is to be executed by a slave data port, will be seen by the slave data port.

As noted above, an adaptive multijunction unit according to the present invention will automatically search for the correct data rate if it does not see the Barker synchronization code within a specified number of bytes. This search operation is restricted to the master data port, since it is the recipient of the data from the master adaptive digital service unit, and hence, is connected to the most reliable data stream for determining the system data rate. When the master data port determines the correct data rate, it communicates that data rate to the slave data port microprocessors.

Figure 8:
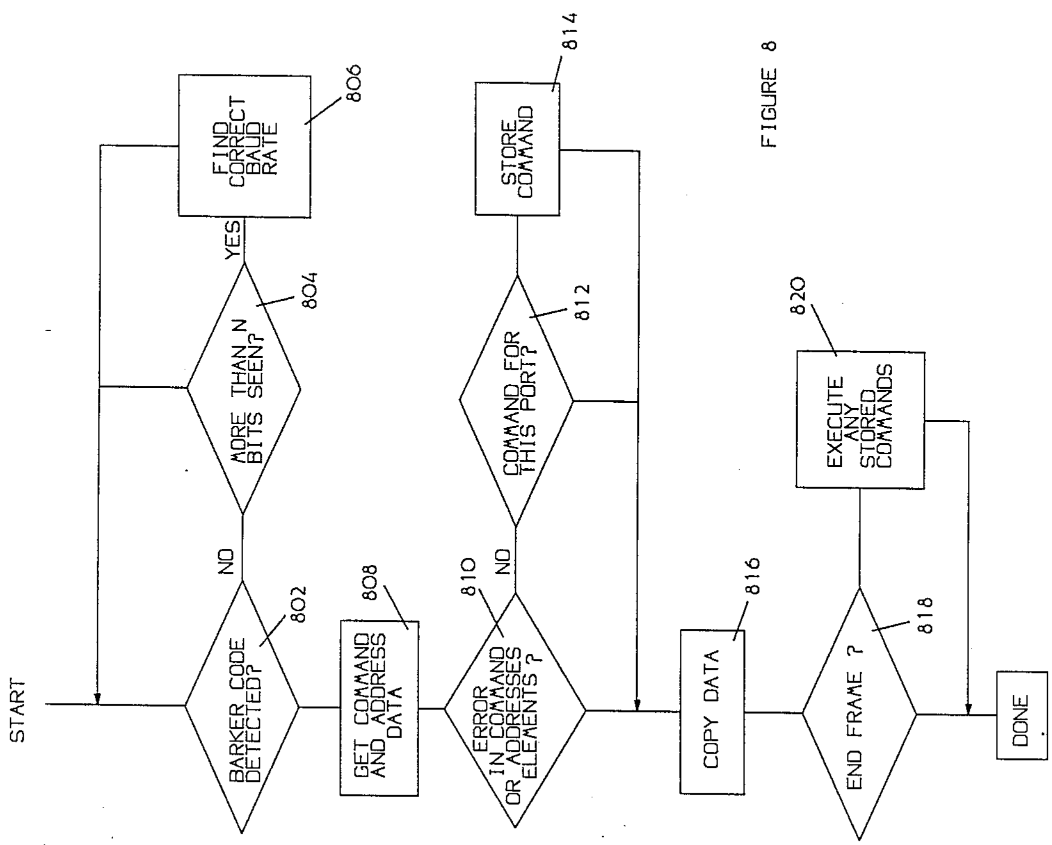
FIG. 8 a flow chart of the command execution cycle of the microprocessor when it monitors data leaving the input port of a master data port.

A flow chart of the command execution cycle of the microprocessor when it monitors data leaving the the input port of a master data port is shown in FIG. 8. The microprocessor searches for the Barker synchronization code which begins each data frame as shown at 802. If more than N bytes are seen without finding the Barker code, the microprocessor initiates a search for the correct system rate as discussed above and as shown at 804 and 806. When the Barker code is found, the microprocessor extracts the command and address data as shown at 808. These data immediately follow the Barker code. The microprocessor also examines the ECC bits in the frame elements containing the command and address data to determine if transmission errors have occurred as shown at 810. If no transmission errors have occurred, the microprocessor compares the address in the command data with the address assigned to the master data port, as shown at 812. If the addresses match, the command is stored for execution at the end of the reception of the current frame as shown at 814. As noted above, the only commands which are immediately executed are the ACTIVATE and DEACTIVATE commands which are received by the slave ports. If the command data included transmission errors, the command is ignored.

The command data as well as the rest of the frame are copied to the output ports in the slave data ports, as shown at 816. When the microprocessor sees the last byte of the frame, it executes any stored commands as shown at 818 and 820.

The operations carried out by the input ports of the slave data ports differ in two respects from those described above for the master data port. First, the slave data ports do not attempt to find the correct system speed if the Barker code is not detected. Second, when a slave data port receives an ACTIVATE or DEACTIVATE command, it executes the command immediately, instead of storing it for execution when the end of frame has past.

The operations for data monitored at the entrance to the output port are similar to those described above unless the microprocessor has command data which must be inserted into a frame. As noted above, the various ports may insert command data into the next frame leaving the port in response to a command received by the adaptive multijunction unit in a data stream passing therethrough or from the command port.

If data is to be inserted into an outgoing frame, the microprocessor interrupts the flow of data entering the output port and inserts the new data. The normal flow of data is then re-established.

Accordingly, an improved adaptive multijunction unit has been described. While preferred embodiments of the invention have been illustrated and described above, there is no intent to limit the scope of the invention to these or any other specific embodiments. The scope of the invention is defined by the spirit and language of the appended claims.

TABLE I

| Data Rate (Kbits/sec) | Data Bits | Loop Speed (Kbits/sec) |
|---|---|---|
| 1.2 | 192 | 3.5 |
| 2.4 | 384 | 3.5 |
| 4.8 | 384 | 7.0 |
| 9.6 | 384 | 14.0 |
| 19.2 | 384 | 28.0 |
| 32.0 | 320 | 56.0 |
| 38.4 | 384 | 56.0 |

TABLE 11

| DATA WORD | STANDARD ERROR $1_\chi$ | | | | | | | | CORRECTING CODE $2_\chi$ | | | | | | | | IMPROVED ERROR $1_\gamma$ | | | | | | | | CORRECTING CODE $2_\gamma$ | | | | | | | |
|---|---|---|---|---|---|---|---|---|---|---|---|---|---|---|---|---|---|---|---|---|---|---|---|---|---|---|---|---|---|---|---|---|
| x | 1 | 2 | 3 | 4 | 5 | 6 | 7 | 8 | A | B | C | D | E | F | G | H | 1 | 2 | 4 | 7 | A | B | $\overline{D}$ | $\overline{G}$ | 3 | 5 | 6 | 8 | C | E | $\overline{F}$ | $\overline{G}$ |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 1 | 1 |
| 1 | 1 | 0 | 0 | 0 | 0 | 0 | 0 | 0 | 1 | 0 | 0 | 1 | 1 | 1 | 0 | 0 | 1 | 0 | 0 | 0 | 1 | 0 | 0 | 1 | 0 | 0 | 0 | 0 | 0 | 1 | 0 | 1 |
| 2 | 0 | 1 | 0 | 0 | 0 | 0 | 0 | 0 | 0 | 1 | 0 | 0 | 1 | 1 | 1 | 0 | 0 | 1 | 0 | 0 | 0 | 1 | 1 | 0 | 0 | 0 | 0 | 0 | 0 | 1 | 0 | 1 |
| 3 | 1 | 1 | 0 | 0 | 0 | 0 | 0 | 0 | 1 | 1 | 0 | 1 | 0 | 0 | 1 | 0 | 1 | 1 | 0 | 0 | 1 | 1 | 0 | 0 | 0 | 0 | 0 | 0 | 0 | 0 | 1 | 1 |
| 4 | 0 | 0 | 1 | 0 | 0 | 0 | 0 | 0 | 0 | 0 | 1 | 0 | 0 | 1 | 1 | 1 | 0 | 0 | 0 | 0 | 0 | 0 | 1 | 0 | 1 | 0 | 0 | 0 | 1 | 0 | 0 | 0 |
| 5 | 1 | 0 | 1 | 0 | 0 | 0 | 0 | 0 | 1 | 0 | 1 | 1 | 1 | 0 | 1 | 1 | 1 | 0 | 0 | 0 | 1 | 0 | 0 | 0 | 1 | 0 | 0 | 0 | 1 | 1 | 1 | 0 |
| 6 | 0 | 1 | 1 | 0 | 0 | 0 | 0 | 0 | 0 | 1 | 1 | 0 | 1 | 0 | 0 | 1 | 0 | 1 | 0 | 0 | 0 | 1 | 1 | 1 | 1 | 0 | 0 | 0 | 1 | 1 | 1 | 0 |
| 7 | 1 | 1 | 1 | 0 | 0 | 0 | 0 | 0 | 1 | 1 | 1 | 1 | 0 | 1 | 0 | 1 | 1 | 1 | 0 | 0 | 1 | 1 | 0 | 1 | 1 | 0 | 0 | 0 | 1 | 0 | 0 | 0 |
| 8 | 0 | 0 | 0 | 1 | 0 | 0 | 0 | 0 | 1 | 0 | 0 | 0 | 1 | 1 | 1 | 1 | 0 | 0 | 1 | 0 | 1 | 0 | 1 | 0 | 0 | 0 | 0 | 0 | 0 | 1 | 0 | 0 |
| 9 | 1 | 0 | 0 | 1 | 0 | 0 | 0 | 0 | 0 | 0 | 0 | 1 | 0 | 0 | 1 | 1 | 1 | 0 | 1 | 0 | 0 | 0 | 0 | 0 | 0 | 0 | 0 | 0 | 0 | 0 | 1 | 0 |
| 10 | 0 | 1 | 0 | 1 | 0 | 0 | 0 | 0 | 1 | 1 | 0 | 0 | 0 | 0 | 0 | 1 | 0 | 1 | 1 | 0 | 1 | 1 | 1 | 1 | 0 | 0 | 0 | 0 | 0 | 0 | 1 | 0 |
| 11 | 1 | 1 | 0 | 1 | 0 | 0 | 0 | 0 | 0 | 1 | 0 | 1 | 1 | 1 | 0 | 1 | 1 | 1 | 1 | 0 | 0 | 1 | 0 | 1 | 0 | 0 | 0 | 0 | 0 | 1 | 0 | 0 |
| 12 | 0 | 0 | 1 | 1 | 0 | 0 | 0 | 0 | 1 | 0 | 1 | 0 | 1 | 0 | 0 | 0 | 0 | 0 | 1 | 0 | 1 | 0 | 1 | 1 | 1 | 0 | 0 | 0 | 1 | 1 | 1 | 1 |
| 13 | 1 | 0 | 1 | 1 | 0 | 0 | 0 | 0 | 0 | 0 | 1 | 1 | 0 | 1 | 0 | 0 | 1 | 0 | 1 | 0 | 0 | 0 | 0 | 1 | 1 | 0 | 0 | 0 | 1 | 0 | 0 | 1 |
| 14 | 0 | 1 | 1 | 1 | 0 | 0 | 0 | 0 | 1 | 1 | 1 | 0 | 0 | 1 | 1 | 0 | 0 | 1 | 1 | 0 | 1 | 1 | 1 | 0 | 1 | 0 | 0 | 0 | 1 | 0 | 0 | 1 |
| 15 | 1 | 1 | 1 | 1 | 0 | 0 | 0 | 0 | 0 | 1 | 1 | 1 | 1 | 0 | 1 | 0 | 1 | 1 | 1 | 0 | 0 | 1 | 0 | 0 | 1 | 0 | 0 | 0 | 1 | 1 | 1 | 1 |
| 16 | 0 | 0 | 0 | 0 | 1 | 0 | 0 | 0 | 1 | 1 | 0 | 1 | 1 | 0 | 1 | 1 | 0 | 0 | 0 | 0 | 1 | 1 | 0 | 0 | 0 | 1 | 0 | 0 | 0 | 1 | 1 | 0 |
| 17 | 1 | 0 | 0 | 0 | 1 | 0 | 0 | 0 | 0 | 1 | 0 | 0 | 0 | 1 | 1 | 1 | 1 | 0 | 0 | 0 | 0 | 1 | 1 | 0 | 0 | 1 | 0 | 0 | 0 | 0 | 0 | 0 |
| 18 | 0 | 1 | 0 | 0 | 1 | 0 | 0 | 0 | 1 | 0 | 0 | 1 | 0 | 1 | 0 | 1 | 0 | 1 | 0 | 0 | 1 | 0 | 0 | 1 | 0 | 1 | 0 | 0 | 0 | 0 | 0 | 0 |
| 19 | 1 | 1 | 0 | 0 | 1 | 0 | 0 | 0 | 0 | 0 | 0 | 0 | 1 | 0 | 0 | 1 | 1 | 1 | 0 | 0 | 0 | 0 | 1 | 1 | 0 | 1 | 0 | 0 | 0 | 1 | 1 | 0 |
| 20 | 0 | 0 | 1 | 0 | 1 | 0 | 0 | 0 | 1 | 1 | 1 | 1 | 1 | 1 | 0 | 0 | 0 | 0 | 0 | 0 | 1 | 1 | 0 | 1 | 1 | 1 | 0 | 0 | 1 | 1 | 0 | 1 |
| 21 | 1 | 0 | 1 | 0 | 1 | 0 | 0 | 0 | 0 | 1 | 1 | 0 | 0 | 0 | 0 | 0 | 1 | 0 | 0 | 0 | 0 | 1 | 1 | 1 | 1 | 1 | 0 | 0 | 1 | 0 | 1 | 1 |
| 22 | 0 | 1 | 1 | 0 | 1 | 0 | 0 | 0 | 1 | 0 | 1 | 1 | 0 | 0 | 1 | 0 | 0 | 1 | 0 | 0 | 1 | 0 | 0 | 0 | 1 | 1 | 0 | 0 | 1 | 0 | 1 | 1 |
| 23 | 1 | 1 | 1 | 0 | 1 | 0 | 0 | 0 | 0 | 0 | 1 | 0 | 1 | 1 | 1 | 0 | 1 | 1 | 0 | 0 | 0 | 0 | 1 | 0 | 1 | 1 | 0 | 0 | 1 | 1 | 0 | 1 |
| 24 | 0 | 0 | 0 | 1 | 1 | 0 | 0 | 0 | 0 | 1 | 0 | 1 | 0 | 1 | 0 | 0 | 0 | 0 | 1 | 0 | 0 | 1 | 0 | 1 | 0 | 1 | 0 | 0 | 0 | 0 | 0 | 1 |
| 25 | 1 | 0 | 0 | 1 | 1 | 0 | 0 | 0 | 1 | 1 | 0 | 0 | 1 | 0 | 0 | 0 | 1 | 0 | 1 | 0 | 1 | 1 | 1 | 1 | 0 | 1 | 0 | 0 | 0 | 1 | 1 | 1 |
| 26 | 0 | 1 | 0 | 1 | 1 | 0 | 0 | 0 | 0 | 0 | 0 | 1 | 1 | 0 | 1 | 0 | 0 | 1 | 1 | 0 | 0 | 0 | 0 | 0 | 0 | 1 | 0 | 0 | 0 | 1 | 1 | 1 |
| 27 | 1 | 1 | 0 | 1 | 1 | 0 | 0 | 0 | 1 | 0 | 0 | 0 | 0 | 1 | 1 | 0 | 1 | 1 | 1 | 0 | 1 | 0 | 1 | 0 | 0 | 1 | 0 | 0 | 0 | 0 | 0 | 1 |
| 28 | 0 | 0 | 1 | 1 | 1 | 0 | 0 | 0 | 0 | 1 | 1 | 1 | 0 | 0 | 1 | 1 | 0 | 0 | 1 | 0 | 0 | 1 | 0 | 0 | 1 | 1 | 0 | 0 | 1 | 0 | 1 | 0 |
| 29 | 1 | 0 | 1 | 1 | 1 | 0 | 0 | 0 | 1 | 1 | 1 | 0 | 1 | 1 | 1 | 1 | 1 | 0 | 1 | 0 | 1 | 1 | 1 | 0 | 1 | 1 | 0 | 0 | 1 | 1 | 0 | 0 |
| 30 | 0 | 1 | 1 | 1 | 1 | 0 | 0 | 0 | 0 | 0 | 1 | 1 | 1 | 1 | 0 | 1 | 0 | 1 | 1 | 0 | 0 | 0 | 0 | 1 | 1 | 1 | 0 | 0 | 1 | 1 | 0 | 0 |
| 31 | 1 | 1 | 1 | 1 | 1 | 0 | 0 | 0 | 1 | 0 | 1 | 0 | 0 | 0 | 0 | 1 | 1 | 1 | 1 | 0 | 1 | 0 | 1 | 1 | 1 | 1 | 0 | 0 | 1 | 0 | 1 | 0 |
| 32 | 0 | 0 | 0 | 0 | 0 | 1 | 0 | 0 | 1 | 1 | 1 | 1 | 0 | 0 | 0 | 1 | 0 | 0 | 0 | 0 | 1 | 1 | 0 | 1 | 0 | 0 | 1 | 0 | 1 | 0 | 1 | 0 |
| 33 | 1 | 0 | 0 | 0 | 0 | 1 | 0 | 0 | 0 | 1 | 1 | 0 | 1 | 1 | 0 | 1 | 1 | 0 | 0 | 0 | 0 | 1 | 1 | 1 | 0 | 0 | 1 | 0 | 1 | 1 | 0 | 0 |
| 34 | 0 | 1 | 0 | 0 | 0 | 1 | 0 | 0 | 1 | 0 | 1 | 1 | 1 | 1 | 1 | 1 | 0 | 1 | 0 | 0 | 1 | 0 | 0 | 0 | 0 | 0 | 1 | 0 | 1 | 1 | 0 | 0 |
| 35 | 1 | 1 | 0 | 0 | 0 | 1 | 0 | 0 | 0 | 0 | 1 | 0 | 0 | 0 | 1 | 1 | 1 | 1 | 0 | 0 | 0 | 0 | 1 | 0 | 0 | 0 | 1 | 0 | 1 | 0 | 1 | 0 |
| 36 | 0 | 0 | 1 | 0 | 0 | 1 | 0 | 0 | 1 | 1 | 0 | 1 | 0 | 1 | 1 | 0 | 0 | 0 | 0 | 0 | 1 | 1 | 0 | 0 | 1 | 0 | 1 | 0 | 0 | 0 | 0 | 1 |
| 37 | 1 | 0 | 1 | 0 | 0 | 1 | 0 | 0 | 0 | 1 | 0 | 0 | 1 | 0 | 1 | 0 | 1 | 0 | 0 | 0 | 0 | 1 | 1 | 0 | 1 | 0 | 1 | 0 | 0 | 1 | 1 | 1 |
| 38 | 0 | 1 | 1 | 0 | 0 | 1 | 0 | 0 | 1 | 0 | 0 | 1 | 1 | 0 | 0 | 0 | 0 | 1 | 0 | 0 | 1 | 0 | 0 | 1 | 1 | 0 | 1 | 0 | 0 | 1 | 1 | 1 |
| 39 | 1 | 1 | 1 | 0 | 0 | 1 | 0 | 0 | 0 | 0 | 0 | 0 | 0 | 1 | 0 | 0 | 1 | 1 | 0 | 0 | 0 | 0 | 1 | 1 | 1 | 0 | 1 | 0 | 0 | 0 | 0 | 1 |
| 40 | 0 | 0 | 0 | 1 | 0 | 1 | 0 | 0 | 0 | 1 | 1 | 1 | 1 | 1 | 1 | 0 | 0 | 0 | 1 | 0 | 0 | 1 | 0 | 0 | 0 | 0 | 1 | 0 | 1 | 1 | 0 | 1 |
| 41 | 1 | 0 | 0 | 1 | 0 | 1 | 0 | 0 | 1 | 1 | 1 | 0 | 0 | 0 | 1 | 0 | 1 | 0 | 1 | 0 | 1 | 1 | 1 | 0 | 0 | 0 | 1 | 0 | 1 | 0 | 1 | 1 |
| 42 | 0 | 1 | 0 | 1 | 0 | 1 | 0 | 0 | 0 | 0 | 1 | 1 | 0 | 0 | 0 | 0 | 0 | 1 | 1 | 0 | 0 | 0 | 0 | 1 | 0 | 0 | 1 | 0 | 1 | 0 | 1 | 1 |
| 43 | 1 | 1 | 0 | 1 | 0 | 1 | 0 | 0 | 1 | 0 | 1 | 0 | 1 | 1 | 0 | 0 | 1 | 1 | 1 | 0 | 1 | 0 | 1 | 1 | 0 | 0 | 1 | 0 | 1 | 1 | 0 | 1 |
| 44 | 0 | 0 | 1 | 1 | 0 | 1 | 0 | 0 | 0 | 1 | 0 | 1 | 1 | 0 | 0 | 1 | 0 | 0 | 1 | 0 | 0 | 1 | 0 | 1 | 1 | 0 | 1 | 0 | 0 | 1 | 1 | 0 |
| 45 | 1 | 0 | 1 | 1 | 0 | 1 | 0 | 0 | 1 | 1 | 0 | 0 | 0 | 1 | 0 | 1 | 1 | 0 | 1 | 0 | 1 | 1 | 1 | 1 | 1 | 0 | 1 | 0 | 0 | 0 | 0 | 0 |
| 46 | 0 | 1 | 1 | 1 | 0 | 1 | 0 | 0 | 0 | 0 | 0 | 1 | 0 | 1 | 1 | 1 | 0 | 1 | 1 | 0 | 0 | 0 | 0 | 0 | 1 | 0 | 1 | 0 | 0 | 0 | 0 | 0 |
| 47 | 1 | 1 | 1 | 1 | 0 | 1 | 0 | 0 | 1 | 0 | 0 | 0 | 1 | 0 | 1 | 1 | 1 | 1 | 1 | 0 | 1 | 0 | 1 | 0 | 1 | 0 | 1 | 0 | 0 | 1 | 1 | 0 |
| 48 | 0 | 0 | 0 | 0 | 1 | 1 | 0 | 0 | 0 | 0 | 1 | 0 | 1 | 0 | 1 | 0 | 0 | 0 | 0 | 0 | 0 | 0 | 1 | 0 | 0 | 1 | 1 | 0 | 1 | 1 | 1 | 1 |
| 49 | 1 | 0 | 0 | 0 | 1 | 1 | 0 | 0 | 1 | 0 | 1 | 1 | 0 | 1 | 1 | 0 | 1 | 0 | 0 | 0 | 1 | 0 | 0 | 0 | 0 | 1 | 1 | 0 | 1 | 0 | 0 | 1 |

TABLE 11-continued

| DATA WORD | STANDARD ERROR $1\chi$ | | | | | | | | CORRECTING CODE $2\chi$ | | | | | | | | IMPROVED ERROR $1\gamma$ | | | | | | | | CORRECTING CODE $2\gamma$ | | | | | | | |
|---|---|---|---|---|---|---|---|---|---|---|---|---|---|---|---|---|---|---|---|---|---|---|---|---|---|---|---|---|---|---|---|---|
| x | 1 | 2 | 3 | 4 | 5 | 6 | 7 | 8 | A | B | C | D | E | F | G | H | 1 | 2 | 4 | 7 | A | B | $\overline{D}$ | $\overline{G}$ | 3 | 5 | 6 | 8 | C | E | $\overline{F}$ | $\overline{G}$ |
| 50 | 0 | 1 | 0 | 0 | 1 | 1 | 0 | 0 | 0 | 1 | 1 | 0 | 0 | 1 | 0 | 0 | 0 | 1 | 0 | 0 | 0 | 1 | 1 | 1 | 0 | 1 | 1 | 0 | 1 | 0 | 0 | 1 |
| 51 | 1 | 1 | 0 | 0 | 1 | 1 | 0 | 0 | 1 | 1 | 1 | 1 | 1 | 0 | 0 | 0 | 1 | 1 | 0 | 0 | 1 | 1 | 0 | 1 | 0 | 1 | 1 | 0 | 1 | 1 | 1 | 1 |
| 52 | 0 | 0 | 1 | 0 | 1 | 1 | 0 | 0 | 0 | 0 | 0 | 0 | 1 | 1 | 0 | 1 | 0 | 0 | 0 | 0 | 0 | 0 | 1 | 1 | 1 | 1 | 1 | 0 | 0 | 1 | 0 | 0 |
| 53 | 1 | 0 | 1 | 0 | 1 | 1 | 0 | 0 | 1 | 0 | 0 | 1 | 0 | 0 | 0 | 1 | 1 | 0 | 0 | 0 | 1 | 0 | 0 | 1 | 1 | 1 | 1 | 0 | 0 | 0 | 1 | 0 |
| 54 | 0 | 1 | 1 | 0 | 1 | 1 | 0 | 0 | 0 | 1 | 0 | 0 | 0 | 0 | 1 | 1 | 0 | 1 | 0 | 0 | 0 | 1 | 1 | 0 | 1 | 1 | 1 | 0 | 0 | 0 | 1 | 0 |
| 55 | 1 | 1 | 1 | 0 | 1 | 1 | 0 | 0 | 1 | 1 | 0 | 1 | 1 | 1 | 1 | 1 | 1 | 1 | 0 | 0 | 1 | 1 | 0 | 0 | 1 | 1 | 1 | 0 | 0 | 1 | 0 | 0 |
| 56 | 0 | 0 | 0 | 1 | 1 | 1 | 0 | 0 | 1 | 0 | 1 | 0 | 0 | 1 | 0 | 1 | 0 | 0 | 1 | 0 | 1 | 0 | 1 | 1 | 0 | 1 | 1 | 0 | 1 | 0 | 0 | 0 |
| 57 | 1 | 0 | 0 | 1 | 1 | 1 | 0 | 0 | 0 | 0 | 1 | 1 | 1 | 0 | 0 | 1 | 1 | 0 | 1 | 0 | 0 | 0 | 0 | 1 | 0 | 1 | 1 | 0 | 1 | 1 | 1 | 0 |
| 58 | 0 | 1 | 0 | 1 | 1 | 1 | 0 | 0 | 1 | 1 | 1 | 0 | 1 | 0 | 1 | 1 | 0 | 1 | 1 | 0 | 1 | 1 | 1 | 0 | 0 | 1 | 1 | 0 | 1 | 1 | 1 | 0 |
| 59 | 1 | 1 | 0 | 1 | 1 | 1 | 0 | 0 | 0 | 1 | 1 | 1 | 0 | 1 | 1 | 1 | 1 | 1 | 1 | 0 | 0 | 1 | 0 | 0 | 0 | 1 | 1 | 0 | 1 | 0 | 0 | 0 |
| 60 | 0 | 0 | 1 | 1 | 1 | 1 | 0 | 0 | 1 | 0 | 0 | 0 | 0 | 0 | 1 | 0 | 0 | 0 | 1 | 0 | 1 | 0 | 1 | 0 | 1 | 1 | 1 | 0 | 0 | 0 | 1 | 1 |
| 61 | 1 | 0 | 1 | 1 | 1 | 1 | 0 | 0 | 0 | 0 | 0 | 1 | 1 | 1 | 1 | 0 | 1 | 0 | 1 | 0 | 0 | 0 | 0 | 0 | 1 | 1 | 1 | 0 | 0 | 1 | 0 | 1 |
| 62 | 0 | 1 | 1 | 1 | 1 | 1 | 0 | 0 | 1 | 1 | 0 | 0 | 1 | 1 | 0 | 0 | 0 | 1 | 1 | 0 | 1 | 1 | 1 | 1 | 1 | 1 | 1 | 0 | 0 | 1 | 0 | 1 |
| 63 | 1 | 1 | 1 | 1 | 1 | 1 | 0 | 0 | 0 | 1 | 0 | 1 | 0 | 0 | 0 | 0 | 1 | 1 | 1 | 0 | 0 | 1 | 0 | 1 | 1 | 1 | 1 | 0 | 0 | 0 | 1 | 1 |
| 64 | 0 | 0 | 0 | 0 | 0 | 0 | 1 | 0 | 1 | 1 | 1 | 0 | 0 | 1 | 0 | 0 | 0 | 0 | 0 | 1 | 1 | 1 | 1 | 1 | 0 | 0 | 0 | 0 | 1 | 0 | 0 | 1 |
| 65 | 1 | 0 | 0 | 0 | 0 | 0 | 1 | 0 | 0 | 1 | 1 | 1 | 1 | 0 | 0 | 0 | 1 | 0 | 0 | 1 | 0 | 1 | 0 | 1 | 0 | 0 | 0 | 0 | 1 | 1 | 1 | 1 |
| 66 | 0 | 1 | 0 | 0 | 0 | 0 | 1 | 0 | 1 | 0 | 1 | 0 | 1 | 0 | 1 | 0 | 0 | 1 | 0 | 1 | 1 | 0 | 1 | 0 | 0 | 0 | 0 | 0 | 1 | 1 | 1 | 1 |
| 67 | 1 | 1 | 0 | 0 | 0 | 0 | 1 | 0 | 0 | 0 | 1 | 1 | 0 | 1 | 1 | 0 | 1 | 1 | 0 | 1 | 0 | 0 | 0 | 0 | 0 | 0 | 0 | 0 | 1 | 0 | 0 | 1 |
| 68 | 0 | 0 | 1 | 0 | 0 | 0 | 1 | 0 | 1 | 1 | 0 | 0 | 0 | 0 | 1 | 1 | 0 | 0 | 0 | 1 | 1 | 1 | 1 | 0 | 1 | 0 | 0 | 0 | 0 | 0 | 1 | 0 |
| 69 | 1 | 0 | 1 | 0 | 0 | 0 | 1 | 0 | 0 | 1 | 0 | 1 | 1 | 1 | 1 | 1 | 1 | 0 | 0 | 1 | 0 | 1 | 0 | 0 | 1 | 0 | 0 | 0 | 0 | 1 | 0 | 0 |
| 70 | 0 | 1 | 1 | 0 | 0 | 0 | 1 | 0 | 1 | 0 | 0 | 0 | 1 | 1 | 0 | 1 | 0 | 1 | 0 | 1 | 1 | 0 | 1 | 1 | 1 | 0 | 0 | 0 | 0 | 1 | 0 | 0 |
| 71 | 1 | 1 | 1 | 0 | 0 | 0 | 1 | 0 | 0 | 0 | 0 | 1 | 0 | 0 | 0 | 1 | 1 | 1 | 0 | 1 | 0 | 0 | 0 | 1 | 1 | 0 | 0 | 0 | 0 | 0 | 1 | 0 |
| 72 | 0 | 0 | 0 | 1 | 0 | 0 | 1 | 0 | 0 | 1 | 1 | 0 | 1 | 0 | 1 | 1 | 0 | 0 | 1 | 1 | 0 | 1 | 1 | 0 | 0 | 0 | 0 | 0 | 1 | 1 | 1 | 0 |
| 73 | 1 | 0 | 0 | 1 | 0 | 0 | 1 | 0 | 1 | 1 | 1 | 1 | 0 | 1 | 1 | 1 | 1 | 0 | 1 | 1 | 1 | 1 | 0 | 0 | 0 | 0 | 0 | 0 | 1 | 0 | 0 | 0 |
| 74 | 0 | 1 | 0 | 1 | 0 | 0 | 1 | 0 | 0 | 0 | 1 | 0 | 0 | 1 | 0 | 1 | 0 | 1 | 1 | 1 | 0 | 0 | 1 | 1 | 0 | 0 | 0 | 0 | 1 | 0 | 0 | 0 |
| 75 | 1 | 1 | 0 | 1 | 0 | 0 | 1 | 0 | 1 | 0 | 1 | 1 | 1 | 0 | 0 | 1 | 1 | 1 | 1 | 1 | 1 | 0 | 0 | 1 | 0 | 0 | 0 | 0 | 1 | 1 | 1 | 0 |
| 76 | 0 | 0 | 1 | 1 | 0 | 0 | 1 | 0 | 0 | 1 | 0 | 0 | 1 | 1 | 0 | 0 | 0 | 0 | 1 | 1 | 0 | 1 | 1 | 1 | 1 | 0 | 0 | 0 | 0 | 1 | 0 | 1 |
| 77 | 1 | 0 | 1 | 1 | 0 | 0 | 1 | 0 | 1 | 1 | 0 | 1 | 0 | 0 | 0 | 0 | 1 | 0 | 1 | 1 | 1 | 1 | 0 | 1 | 1 | 0 | 0 | 0 | 0 | 0 | 1 | 1 |
| 78 | 0 | 1 | 1 | 1 | 0 | 0 | 1 | 0 | 0 | 0 | 0 | 0 | 0 | 0 | 1 | 0 | 0 | 1 | 1 | 1 | 0 | 0 | 1 | 0 | 1 | 0 | 0 | 0 | 0 | 0 | 1 | 1 |
| 79 | 1 | 1 | 1 | 1 | 0 | 0 | 1 | 0 | 1 | 0 | 0 | 1 | 1 | 1 | 1 | 0 | 1 | 1 | 1 | 1 | 1 | 0 | 0 | 0 | 1 | 0 | 0 | 0 | 0 | 1 | 0 | 1 |
| 80 | 0 | 0 | 0 | 0 | 1 | 0 | 1 | 0 | 0 | 0 | 1 | 1 | 1 | 1 | 1 | 1 | 0 | 0 | 0 | 1 | 0 | 0 | 0 | 0 | 0 | 1 | 0 | 0 | 1 | 1 | 0 | 0 |
| 81 | 1 | 0 | 0 | 0 | 1 | 0 | 1 | 0 | 1 | 0 | 1 | 0 | 0 | 0 | 1 | 1 | 1 | 0 | 0 | 1 | 1 | 0 | 1 | 0 | 0 | 1 | 0 | 0 | 1 | 0 | 1 | 0 |
| 82 | 0 | 1 | 0 | 0 | 1 | 0 | 1 | 0 | 0 | 1 | 1 | 1 | 0 | 0 | 0 | 1 | 0 | 1 | 0 | 1 | 0 | 1 | 0 | 1 | 0 | 1 | 0 | 0 | 1 | 0 | 1 | 0 |
| 83 | 1 | 1 | 0 | 0 | 1 | 0 | 1 | 0 | 1 | 1 | 1 | 0 | 1 | 1 | 0 | 1 | 1 | 1 | 0 | 1 | 1 | 1 | 1 | 1 | 0 | 1 | 0 | 0 | 1 | 1 | 0 | 0 |
| 84 | 0 | 0 | 1 | 0 | 1 | 0 | 1 | 0 | 0 | 0 | 0 | 1 | 1 | 0 | 0 | 0 | 0 | 0 | 0 | 1 | 0 | 0 | 0 | 1 | 1 | 1 | 0 | 0 | 0 | 1 | 1 | 1 |
| 85 | 1 | 0 | 1 | 0 | 1 | 0 | 1 | 0 | 1 | 0 | 0 | 0 | 0 | 1 | 0 | 0 | 1 | 0 | 0 | 1 | 1 | 0 | 1 | 1 | 1 | 1 | 0 | 0 | 0 | 0 | 0 | 1 |
| 86 | 0 | 1 | 1 | 0 | 1 | 0 | 1 | 0 | 0 | 1 | 0 | 1 | 0 | 1 | 1 | 0 | 0 | 1 | 0 | 1 | 0 | 1 | 0 | 0 | 1 | 1 | 0 | 0 | 0 | 0 | 0 | 1 |
| 87 | 1 | 1 | 1 | 0 | 1 | 0 | 1 | 0 | 1 | 1 | 0 | 0 | 1 | 0 | 1 | 0 | 1 | 1 | 0 | 1 | 1 | 1 | 1 | 0 | 1 | 1 | 0 | 0 | 0 | 1 | 1 | 1 |
| 88 | 0 | 0 | 0 | 1 | 1 | 0 | 1 | 0 | 1 | 0 | 1 | 1 | 0 | 0 | 0 | 0 | 0 | 0 | 1 | 1 | 1 | 0 | 0 | 1 | 0 | 1 | 0 | 0 | 1 | 0 | 1 | 1 |
| 89 | 1 | 0 | 0 | 1 | 1 | 0 | 1 | 0 | 0 | 0 | 1 | 0 | 1 | 1 | 0 | 0 | 1 | 0 | 1 | 1 | 0 | 0 | 1 | 1 | 0 | 1 | 0 | 0 | 1 | 1 | 0 | 1 |
| 90 | 0 | 1 | 0 | 1 | 1 | 0 | 1 | 0 | 1 | 1 | 1 | 1 | 1 | 1 | 1 | 0 | 0 | 1 | 1 | 1 | 1 | 1 | 0 | 0 | 0 | 1 | 0 | 0 | 1 | 1 | 0 | 1 |
| 91 | 1 | 1 | 0 | 1 | 1 | 0 | 1 | 0 | 0 | 1 | 1 | 0 | 0 | 0 | 1 | 0 | 1 | 1 | 1 | 1 | 0 | 1 | 1 | 0 | 0 | 1 | 0 | 0 | 1 | 0 | 1 | 1 |
| 92 | 0 | 0 | 1 | 1 | 1 | 0 | 1 | 0 | 1 | 0 | 0 | 1 | 0 | 1 | 1 | 1 | 0 | 0 | 1 | 1 | 1 | 0 | 0 | 0 | 1 | 1 | 0 | 0 | 0 | 0 | 0 | 0 |
| 93 | 1 | 0 | 1 | 1 | 1 | 0 | 1 | 0 | 0 | 0 | 0 | 0 | 1 | 0 | 1 | 1 | 1 | 0 | 1 | 1 | 0 | 0 | 1 | 0 | 1 | 1 | 0 | 0 | 0 | 1 | 1 | 0 |
| 94 | 0 | 1 | 1 | 1 | 1 | 0 | 1 | 0 | 1 | 1 | 0 | 1 | 1 | 0 | 0 | 1 | 0 | 1 | 1 | 1 | 1 | 1 | 0 | 1 | 1 | 1 | 0 | 0 | 0 | 1 | 1 | 0 |
| 95 | 1 | 1 | 1 | 1 | 1 | 0 | 1 | 0 | 0 | 1 | 0 | 0 | 0 | 1 | 0 | 1 | 1 | 1 | 1 | 1 | 0 | 1 | 1 | 1 | 1 | 1 | 0 | 0 | 0 | 0 | 0 | 0 |
| 96 | 0 | 0 | 0 | 0 | 0 | 1 | 1 | 0 | 0 | 0 | 0 | 1 | 0 | 1 | 0 | 1 | 0 | 0 | 0 | 1 | 0 | 0 | 0 | 1 | 0 | 0 | 1 | 0 | 0 | 0 | 0 | 0 |
| 97 | 1 | 0 | 0 | 0 | 0 | 1 | 1 | 0 | 1 | 0 | 0 | 0 | 1 | 0 | 0 | 1 | 1 | 0 | 0 | 1 | 1 | 0 | 1 | 1 | 0 | 0 | 1 | 0 | 0 | 1 | 1 | 0 |
| 98 | 0 | 1 | 0 | 0 | 0 | 1 | 1 | 0 | 0 | 1 | 0 | 1 | 1 | 0 | 1 | 1 | 0 | 1 | 0 | 1 | 0 | 1 | 0 | 0 | 0 | 0 | 1 | 0 | 0 | 1 | 1 | 0 |
| 99 | 1 | 1 | 0 | 0 | 0 | 1 | 1 | 0 | 1 | 1 | 0 | 0 | 0 | 1 | 1 | 1 | 1 | 1 | 0 | 1 | 1 | 1 | 1 | 0 | 0 | 0 | 1 | 0 | 0 | 0 | 0 | 0 |

TABLE 11-continued

| DATA WORD | STANDARD ERROR 1χ | | | | | | | | CORRECTING CODE 2χ | | | | | | | | IMPROVED ERROR 1γ | | | | | | | | CORRECTING CODE 2γ | | | | | | | |
|---|---|---|---|---|---|---|---|---|---|---|---|---|---|---|---|---|---|---|---|---|---|---|---|---|---|---|---|---|---|---|---|---|
| x | 1 | 2 | 3 | 4 | 5 | 6 | 7 | 8 | A | B | C | D | E | F | G | H | 1 | 2 | 4 | 7 | A | B | $\overline{D}$ | $\overline{G}$ | 3 | 5 | 6 | 8 | C | E | $\overline{F}$ | $\overline{G}$ |
| 100 | 0 | 0 | 1 | 0 | 0 | 1 | 1 | 0 | 0 | 0 | 1 | 1 | 0 | 0 | 1 | 0 | 0 | 0 | 0 | 1 | 0 | 0 | 0 | 0 | 1 | 0 | 1 | 0 | 1 | 0 | 1 | 1 |
| 101 | 1 | 0 | 1 | 0 | 0 | 1 | 1 | 0 | 1 | 0 | 1 | 0 | 1 | 1 | 1 | 0 | 1 | 0 | 0 | 1 | 1 | 0 | 1 | 0 | 1 | 0 | 1 | 0 | 1 | 1 | 0 | 1 |
| 102 | 0 | 1 | 1 | 0 | 0 | 1 | 1 | 0 | 0 | 1 | 1 | 1 | 1 | 1 | 0 | 0 | 0 | 1 | 0 | 1 | 0 | 1 | 0 | 1 | 1 | 0 | 1 | 0 | 1 | 1 | 0 | 1 |
| 103 | 1 | 1 | 1 | 0 | 0 | 1 | 1 | 0 | 1 | 1 | 1 | 0 | 0 | 0 | 0 | 0 | 1 | 1 | 0 | 1 | 1 | 1 | 1 | 1 | 1 | 0 | 1 | 0 | 1 | 0 | 1 | 1 |
| 104 | 0 | 0 | 0 | 1 | 0 | 1 | 1 | 0 | 1 | 0 | 0 | 1 | 1 | 0 | 1 | 0 | 0 | 0 | 1 | 1 | 1 | 0 | 0 | 0 | 0 | 0 | 1 | 0 | 0 | 1 | 1 | 1 |
| 105 | 1 | 0 | 0 | 1 | 0 | 1 | 1 | 0 | 0 | 0 | 0 | 0 | 0 | 1 | 1 | 0 | 1 | 0 | 1 | 1 | 0 | 0 | 1 | 0 | 0 | 0 | 1 | 0 | 0 | 0 | 0 | 1 |
| 106 | 0 | 1 | 0 | 1 | 0 | 1 | 1 | 0 | 1 | 1 | 0 | 1 | 0 | 1 | 0 | 0 | 0 | 1 | 1 | 1 | 1 | 1 | 0 | 1 | 0 | 0 | 1 | 0 | 0 | 0 | 0 | 1 |
| 107 | 1 | 1 | 0 | 1 | 0 | 1 | 1 | 0 | 0 | 1 | 0 | 0 | 1 | 0 | 0 | 0 | 1 | 1 | 1 | 1 | 0 | 1 | 1 | 1 | 0 | 0 | 1 | 0 | 0 | 1 | 1 | 1 |
| 108 | 0 | 0 | 1 | 1 | 0 | 1 | 1 | 0 | 1 | 0 | 1 | 1 | 1 | 1 | 0 | 1 | 0 | 0 | 1 | 1 | 1 | 0 | 0 | 1 | 1 | 0 | 1 | 0 | 1 | 1 | 0 | 0 |
| 109 | 1 | 0 | 1 | 1 | 0 | 1 | 1 | 0 | 0 | 0 | 1 | 0 | 0 | 0 | 0 | 1 | 1 | 0 | 1 | 1 | 0 | 0 | 1 | 1 | 1 | 0 | 1 | 0 | 1 | 0 | 1 | 0 |
| 110 | 0 | 1 | 1 | 1 | 0 | 1 | 1 | 0 | 1 | 1 | 1 | 1 | 0 | 0 | 1 | 1 | 0 | 1 | 1 | 1 | 1 | 1 | 0 | 0 | 1 | 0 | 1 | 0 | 1 | 0 | 1 | 0 |
| 111 | 1 | 1 | 1 | 1 | 0 | 1 | 1 | 0 | 0 | 1 | 1 | 0 | 1 | 1 | 1 | 1 | 1 | 1 | 1 | 1 | 0 | 1 | 1 | 0 | 1 | 0 | 1 | 0 | 1 | 1 | 0 | 0 |
| 112 | 0 | 0 | 0 | 0 | 1 | 1 | 1 | 0 | 1 | 1 | 0 | 0 | 1 | 1 | 1 | 0 | 0 | 0 | 0 | 1 | 1 | 1 | 1 | 0 | 0 | 1 | 1 | 0 | 0 | 1 | 0 | 1 |
| 113 | 1 | 0 | 0 | 0 | 1 | 1 | 1 | 0 | 0 | 1 | 0 | 1 | 0 | 0 | 1 | 0 | 1 | 0 | 0 | 1 | 0 | 1 | 0 | 0 | 0 | 1 | 1 | 0 | 0 | 0 | 1 | 1 |
| 114 | 0 | 1 | 0 | 0 | 1 | 1 | 1 | 0 | 1 | 0 | 0 | 0 | 0 | 0 | 0 | 0 | 0 | 1 | 0 | 1 | 1 | 0 | 1 | 1 | 0 | 1 | 1 | 0 | 0 | 0 | 1 | 1 |
| 115 | 1 | 1 | 0 | 0 | 1 | 1 | 1 | 0 | 0 | 0 | 0 | 1 | 1 | 1 | 0 | 0 | 1 | 1 | 0 | 1 | 0 | 0 | 0 | 1 | 0 | 1 | 1 | 0 | 0 | 1 | 0 | 1 |
| 116 | 0 | 0 | 1 | 0 | 1 | 1 | 1 | 0 | 1 | 1 | 1 | 0 | 1 | 0 | 0 | 1 | 0 | 0 | 0 | 1 | 1 | 1 | 1 | 1 | 1 | 1 | 1 | 0 | 1 | 1 | 1 | 0 |
| 117 | 1 | 0 | 1 | 0 | 1 | 1 | 1 | 0 | 0 | 1 | 1 | 1 | 0 | 1 | 0 | 1 | 1 | 0 | 0 | 1 | 0 | 1 | 0 | 1 | 1 | 1 | 1 | 0 | 1 | 0 | 0 | 0 |
| 118 | 0 | 1 | 1 | 0 | 1 | 1 | 1 | 0 | 1 | 0 | 1 | 0 | 0 | 1 | 1 | 1 | 0 | 1 | 0 | 1 | 1 | 0 | 1 | 0 | 1 | 1 | 1 | 0 | 1 | 0 | 0 | 0 |
| 119 | 1 | 1 | 1 | 0 | 1 | 1 | 1 | 0 | 0 | 0 | 1 | 1 | 1 | 0 | 1 | 1 | 1 | 1 | 0 | 1 | 0 | 0 | 0 | 0 | 1 | 1 | 1 | 0 | 1 | 1 | 1 | 0 |
| 120 | 0 | 0 | 0 | 1 | 1 | 1 | 1 | 0 | 0 | 1 | 0 | 0 | 0 | 0 | 0 | 1 | 0 | 0 | 1 | 1 | 0 | 1 | 1 | 1 | 0 | 1 | 1 | 0 | 0 | 0 | 1 | 0 |
| 121 | 1 | 0 | 0 | 1 | 1 | 1 | 1 | 0 | 1 | 1 | 0 | 1 | 1 | 1 | 0 | 1 | 1 | 0 | 1 | 1 | 1 | 1 | 0 | 1 | 0 | 1 | 1 | 0 | 0 | 1 | 0 | 0 |
| 122 | 0 | 1 | 0 | 1 | 1 | 1 | 1 | 0 | 0 | 0 | 0 | 0 | 1 | 1 | 1 | 1 | 0 | 1 | 1 | 1 | 0 | 0 | 1 | 0 | 0 | 1 | 1 | 0 | 0 | 1 | 0 | 0 |
| 123 | 1 | 1 | 0 | 1 | 1 | 1 | 1 | 0 | 1 | 0 | 0 | 1 | 0 | 0 | 1 | 1 | 1 | 1 | 1 | 1 | 1 | 0 | 0 | 0 | 0 | 1 | 1 | 0 | 0 | 0 | 1 | 0 |
| 124 | 0 | 0 | 1 | 1 | 1 | 1 | 1 | 0 | 0 | 1 | 1 | 0 | 0 | 1 | 1 | 0 | 0 | 0 | 1 | 1 | 0 | 1 | 1 | 0 | 1 | 1 | 1 | 0 | 1 | 0 | 0 | 1 |
| 125 | 1 | 0 | 1 | 1 | 1 | 1 | 1 | 0 | 1 | 1 | 1 | 1 | 1 | 0 | 1 | 0 | 1 | 0 | 1 | 1 | 1 | 1 | 0 | 0 | 1 | 1 | 1 | 0 | 1 | 1 | 1 | 1 |
| 126 | 0 | 1 | 1 | 1 | 1 | 1 | 1 | 0 | 0 | 0 | 1 | 0 | 1 | 0 | 0 | 0 | 0 | 1 | 1 | 1 | 0 | 0 | 1 | 1 | 1 | 1 | 1 | 0 | 1 | 1 | 1 | 1 |
| 127 | 1 | 1 | 1 | 1 | 1 | 1 | 1 | 0 | 1 | 0 | 1 | 1 | 0 | 1 | 0 | 0 | 1 | 1 | 1 | 1 | 1 | 0 | 0 | 1 | 1 | 1 | 1 | 0 | 1 | 0 | 0 | 1 |
| 128 | 0 | 0 | 0 | 0 | 0 | 0 | 0 | 1 | 0 | 1 | 1 | 1 | 0 | 0 | 1 | 0 | 0 | 0 | 0 | 0 | 0 | 1 | 0 | 0 | 0 | 0 | 0 | 1 | 1 | 0 | 1 | 1 |
| 129 | 1 | 0 | 0 | 0 | 0 | 0 | 0 | 1 | 1 | 1 | 1 | 0 | 1 | 1 | 1 | 0 | 1 | 0 | 0 | 0 | 1 | 1 | 1 | 0 | 0 | 0 | 0 | 1 | 1 | 1 | 0 | 1 |
| 130 | 0 | 1 | 0 | 0 | 0 | 0 | 0 | 1 | 0 | 0 | 1 | 1 | 1 | 1 | 0 | 0 | 0 | 1 | 0 | 0 | 0 | 0 | 0 | 1 | 0 | 0 | 0 | 1 | 1 | 1 | 0 | 1 |
| 131 | 1 | 1 | 0 | 0 | 0 | 0 | 0 | 1 | 1 | 0 | 1 | 0 | 0 | 0 | 0 | 0 | 1 | 1 | 0 | 0 | 1 | 0 | 1 | 1 | 0 | 0 | 0 | 1 | 1 | 0 | 1 | 1 |
| 132 | 0 | 0 | 1 | 0 | 0 | 0 | 0 | 1 | 0 | 1 | 0 | 1 | 0 | 1 | 0 | 1 | 0 | 0 | 0 | 0 | 0 | 1 | 0 | 1 | 1 | 0 | 0 | 1 | 0 | 0 | 0 | 0 |
| 133 | 1 | 0 | 1 | 0 | 0 | 0 | 0 | 1 | 1 | 1 | 0 | 0 | 1 | 0 | 0 | 1 | 1 | 0 | 0 | 0 | 1 | 1 | 1 | 1 | 1 | 0 | 0 | 1 | 0 | 1 | 1 | 0 |
| 134 | 0 | 1 | 1 | 0 | 0 | 0 | 0 | 1 | 0 | 0 | 0 | 1 | 1 | 0 | 1 | 1 | 0 | 1 | 0 | 0 | 0 | 0 | 0 | 0 | 1 | 0 | 0 | 1 | 0 | 1 | 1 | 0 |
| 135 | 1 | 1 | 1 | 0 | 0 | 0 | 0 | 1 | 1 | 0 | 0 | 0 | 0 | 1 | 1 | 1 | 1 | 1 | 0 | 0 | 1 | 0 | 1 | 0 | 1 | 0 | 0 | 1 | 0 | 0 | 0 | 0 |
| 136 | 0 | 0 | 0 | 1 | 0 | 0 | 0 | 1 | 1 | 1 | 1 | 1 | 1 | 1 | 0 | 1 | 0 | 0 | 1 | 0 | 1 | 1 | 0 | 1 | 0 | 0 | 0 | 1 | 1 | 1 | 0 | 0 |
| 137 | 1 | 0 | 0 | 1 | 0 | 0 | 0 | 1 | 0 | 1 | 1 | 0 | 0 | 0 | 0 | 1 | 1 | 0 | 1 | 0 | 0 | 1 | 1 | 1 | 0 | 0 | 0 | 1 | 1 | 0 | 1 | 0 |
| 138 | 0 | 1 | 0 | 1 | 0 | 0 | 0 | 1 | 1 | 0 | 1 | 1 | 0 | 0 | 1 | 1 | 0 | 1 | 0 | 1 | 0 | 0 | 0 | 0 | 0 | 0 | 0 | 1 | 1 | 0 | 1 | 0 |
| 139 | 1 | 1 | 0 | 1 | 0 | 0 | 0 | 1 | 0 | 0 | 1 | 0 | 1 | 1 | 1 | 1 | 1 | 1 | 1 | 0 | 0 | 0 | 1 | 0 | 0 | 0 | 0 | 1 | 1 | 1 | 0 | 0 |
| 140 | 0 | 0 | 1 | 1 | 0 | 0 | 0 | 1 | 1 | 1 | 0 | 1 | 1 | 0 | 1 | 0 | 0 | 0 | 1 | 0 | 1 | 1 | 0 | 0 | 1 | 0 | 0 | 1 | 0 | 1 | 1 | 1 |
| 141 | 1 | 0 | 1 | 1 | 0 | 0 | 0 | 1 | 0 | 1 | 0 | 0 | 0 | 1 | 1 | 0 | 1 | 0 | 1 | 0 | 0 | 1 | 1 | 0 | 1 | 0 | 0 | 1 | 0 | 0 | 0 | 1 |
| 142 | 0 | 1 | 1 | 1 | 0 | 0 | 0 | 1 | 1 | 0 | 0 | 1 | 0 | 1 | 0 | 0 | 0 | 1 | 1 | 0 | 1 | 0 | 0 | 1 | 1 | 0 | 0 | 1 | 0 | 0 | 0 | 1 |
| 143 | 1 | 1 | 1 | 1 | 0 | 0 | 0 | 1 | 0 | 0 | 0 | 0 | 1 | 0 | 0 | 0 | 1 | 1 | 1 | 0 | 0 | 0 | 1 | 1 | 1 | 0 | 0 | 1 | 0 | 1 | 1 | 1 |
| 144 | 0 | 0 | 0 | 0 | 1 | 0 | 0 | 1 | 1 | 0 | 1 | 0 | 1 | 0 | 0 | 1 | 0 | 0 | 0 | 0 | 1 | 0 | 1 | 1 | 0 | 1 | 0 | 1 | 1 | 1 | 1 | 0 |
| 145 | 1 | 0 | 0 | 0 | 1 | 0 | 0 | 1 | 0 | 0 | 1 | 1 | 0 | 1 | 0 | 1 | 1 | 0 | 0 | 0 | 0 | 0 | 0 | 1 | 0 | 1 | 0 | 1 | 1 | 0 | 0 | 0 |
| 146 | 0 | 1 | 0 | 0 | 1 | 0 | 0 | 1 | 1 | 1 | 1 | 0 | 0 | 1 | 1 | 1 | 0 | 1 | 0 | 0 | 1 | 1 | 1 | 0 | 0 | 1 | 0 | 1 | 1 | 0 | 0 | 0 |
| 147 | 1 | 1 | 0 | 0 | 1 | 0 | 0 | 1 | 0 | 1 | 1 | 1 | 1 | 0 | 1 | 1 | 1 | 1 | 0 | 0 | 0 | 1 | 0 | 0 | 0 | 1 | 0 | 1 | 1 | 1 | 1 | 0 |
| 148 | 0 | 0 | 1 | 0 | 1 | 0 | 0 | 1 | 1 | 0 | 0 | 0 | 1 | 1 | 1 | 0 | 0 | 0 | 0 | 0 | 1 | 0 | 1 | 0 | 1 | 1 | 0 | 1 | 0 | 1 | 0 | 1 |
| 149 | 1 | 0 | 1 | 0 | 1 | 0 | 0 | 1 | 0 | 0 | 0 | 1 | 0 | 0 | 1 | 0 | 1 | 0 | 0 | 0 | 0 | 0 | 0 | 0 | 1 | 1 | 0 | 1 | 0 | 0 | 1 | 1 |

TABLE 11-continued

| DATA WORD | STANDARD ERROR 1χ | | | | | | | | CORRECTING CODE 2χ | | | | | | | | IMPROVED ERROR 1γ | | | | | | | | CORRECTING CODE 2γ | | | | | | | |
|---|---|---|---|---|---|---|---|---|---|---|---|---|---|---|---|---|---|---|---|---|---|---|---|---|---|---|---|---|---|---|---|---|
| x | 1 | 2 | 3 | 4 | 5 | 6 | 7 | 8 | A | B | C | D | E | F | G | H | 1 | 2 | 4 | 7 | A | B | $\overline{D}$ | $\overline{G}$ | 3 | 5 | 6 | 8 | C | E | $\overline{F}$ | $\overline{G}$ |
| 150 | 0 | 1 | 1 | 0 | 1 | 0 | 0 | 1 | 1 | 1 | 0 | 0 | 0 | 0 | 0 | 0 | 0 | 1 | 0 | 0 | 1 | 1 | 1 | 1 | 1 | 1 | 0 | 1 | 0 | 0 | 1 | 1 |
| 151 | 1 | 1 | 1 | 0 | 1 | 0 | 0 | 1 | 0 | 1 | 0 | 1 | 1 | 1 | 0 | 0 | 1 | 1 | 0 | 0 | 0 | 1 | 0 | 1 | 1 | 1 | 0 | 1 | 0 | 1 | 0 | 1 |
| 152 | 0 | 0 | 0 | 1 | 1 | 0 | 0 | 1 | 0 | 0 | 1 | 0 | 0 | 1 | 1 | 0 | 0 | 0 | 1 | 0 | 0 | 0 | 1 | 0 | 0 | 1 | 0 | 1 | 1 | 0 | 0 | 1 |
| 153 | 1 | 0 | 0 | 1 | 1 | 0 | 0 | 1 | 1 | 0 | 1 | 1 | 1 | 0 | 1 | 0 | 1 | 0 | 1 | 0 | 1 | 0 | 0 | 0 | 0 | 1 | 0 | 1 | 1 | 1 | 1 | 1 |
| 154 | 0 | 1 | 0 | 1 | 1 | 0 | 0 | 1 | 0 | 1 | 1 | 0 | 1 | 0 | 0 | 0 | 0 | 1 | 1 | 0 | 0 | 1 | 1 | 1 | 0 | 1 | 0 | 1 | 1 | 1 | 1 | 1 |
| 155 | 1 | 1 | 0 | 1 | 1 | 0 | 0 | 1 | 1 | 1 | 1 | 1 | 0 | 1 | 0 | 0 | 1 | 1 | 1 | 0 | 1 | 1 | 0 | 1 | 0 | 1 | 0 | 1 | 1 | 0 | 0 | 1 |
| 156 | 0 | 0 | 1 | 1 | 1 | 0 | 0 | 1 | 0 | 0 | 0 | 0 | 0 | 0 | 0 | 1 | 0 | 0 | 1 | 0 | 0 | 0 | 1 | 1 | 1 | 1 | 0 | 1 | 0 | 0 | 1 | 0 |
| 157 | 1 | 0 | 1 | 1 | 1 | 0 | 0 | 1 | 1 | 0 | 0 | 1 | 1 | 1 | 0 | 1 | 1 | 0 | 1 | 0 | 1 | 0 | 0 | 1 | 1 | 1 | 0 | 1 | 0 | 1 | 0 | 0 |
| 158 | 0 | 1 | 1 | 1 | 1 | 0 | 0 | 1 | 0 | 1 | 0 | 0 | 1 | 1 | 1 | 1 | 0 | 1 | 1 | 0 | 0 | 1 | 1 | 0 | 1 | 1 | 0 | 1 | 0 | 1 | 0 | 0 |
| 159 | 1 | 1 | 1 | 1 | 1 | 0 | 0 | 1 | 1 | 1 | 0 | 1 | 0 | 0 | 1 | 1 | 1 | 1 | 1 | 0 | 1 | 1 | 0 | 0 | 1 | 1 | 0 | 1 | 0 | 0 | 1 | 0 |
| 160 | 0 | 0 | 0 | 0 | 0 | 1 | 0 | 1 | 1 | 0 | 0 | 0 | 0 | 0 | 1 | 1 | 0 | 0 | 0 | 0 | 1 | 0 | 1 | 0 | 0 | 0 | 1 | 1 | 0 | 0 | 1 | 0 |
| 161 | 1 | 0 | 0 | 0 | 0 | 1 | 0 | 1 | 0 | 0 | 0 | 1 | 1 | 1 | 1 | 1 | 1 | 0 | 0 | 0 | 0 | 0 | 0 | 0 | 0 | 0 | 1 | 1 | 0 | 1 | 0 | 0 |
| 162 | 0 | 1 | 0 | 0 | 0 | 1 | 0 | 1 | 1 | 1 | 0 | 0 | 1 | 1 | 0 | 1 | 0 | 1 | 0 | 0 | 1 | 1 | 1 | 1 | 0 | 0 | 1 | 1 | 0 | 1 | 0 | 0 |
| 163 | 1 | 1 | 0 | 0 | 0 | 1 | 0 | 1 | 0 | 1 | 0 | 1 | 0 | 0 | 0 | 1 | 1 | 1 | 0 | 0 | 0 | 1 | 0 | 1 | 0 | 0 | 1 | 1 | 0 | 0 | 1 | 0 |
| 164 | 0 | 0 | 1 | 0 | 0 | 1 | 0 | 1 | 1 | 0 | 1 | 0 | 0 | 1 | 0 | 0 | 0 | 0 | 0 | 0 | 1 | 0 | 1 | 1 | 1 | 0 | 1 | 1 | 1 | 0 | 0 | 1 |
| 165 | 1 | 0 | 1 | 0 | 0 | 1 | 0 | 1 | 0 | 0 | 1 | 1 | 1 | 0 | 0 | 0 | 1 | 0 | 0 | 0 | 0 | 0 | 0 | 1 | 1 | 0 | 1 | 1 | 1 | 1 | 1 | 1 |
| 166 | 0 | 1 | 1 | 0 | 0 | 1 | 0 | 1 | 1 | 1 | 1 | 0 | 1 | 0 | 1 | 0 | 0 | 1 | 0 | 0 | 1 | 1 | 1 | 0 | 1 | 0 | 1 | 1 | 1 | 1 | 1 | 1 |
| 167 | 1 | 1 | 1 | 0 | 0 | 1 | 0 | 1 | 0 | 1 | 1 | 1 | 0 | 1 | 1 | 0 | 1 | 1 | 0 | 0 | 0 | 1 | 0 | 0 | 1 | 0 | 1 | 1 | 1 | 0 | 0 | 1 |
| 168 | 0 | 0 | 0 | 1 | 0 | 1 | 0 | 1 | 0 | 0 | 0 | 0 | 1 | 1 | 0 | 0 | 0 | 0 | 1 | 0 | 0 | 0 | 1 | 1 | 0 | 0 | 1 | 1 | 0 | 1 | 0 | 1 |
| 169 | 1 | 0 | 0 | 1 | 0 | 1 | 0 | 1 | 1 | 0 | 0 | 1 | 0 | 0 | 0 | 0 | 1 | 0 | 1 | 0 | 1 | 0 | 0 | 1 | 0 | 0 | 1 | 1 | 0 | 0 | 1 | 1 |
| 170 | 0 | 1 | 0 | 1 | 0 | 1 | 0 | 1 | 0 | 1 | 0 | 0 | 0 | 0 | 1 | 0 | 0 | 1 | 1 | 0 | 0 | 1 | 1 | 0 | 0 | 0 | 1 | 1 | 0 | 0 | 1 | 1 |
| 171 | 1 | 1 | 0 | 1 | 0 | 1 | 0 | 1 | 1 | 1 | 0 | 1 | 1 | 1 | 1 | 0 | 1 | 1 | 1 | 0 | 1 | 1 | 0 | 0 | 0 | 0 | 1 | 1 | 0 | 1 | 0 | 1 |
| 172 | 0 | 0 | 1 | 1 | 0 | 1 | 0 | 1 | 0 | 0 | 1 | 0 | 1 | 0 | 1 | 1 | 0 | 0 | 1 | 0 | 0 | 0 | 1 | 0 | 1 | 0 | 1 | 1 | 1 | 1 | 1 | 0 |
| 173 | 1 | 0 | 1 | 1 | 0 | 1 | 0 | 1 | 1 | 0 | 1 | 1 | 0 | 1 | 1 | 1 | 1 | 0 | 1 | 0 | 1 | 0 | 0 | 0 | 1 | 0 | 1 | 1 | 1 | 0 | 0 | 0 |
| 174 | 0 | 1 | 1 | 1 | 0 | 1 | 0 | 1 | 0 | 1 | 1 | 0 | 0 | 1 | 0 | 1 | 0 | 1 | 1 | 0 | 0 | 1 | 1 | 1 | 1 | 0 | 1 | 1 | 1 | 0 | 0 | 0 |
| 175 | 1 | 1 | 1 | 1 | 0 | 1 | 0 | 1 | 1 | 1 | 1 | 1 | 1 | 0 | 0 | 1 | 1 | 1 | 1 | 0 | 1 | 1 | 0 | 1 | 1 | 0 | 1 | 1 | 1 | 1 | 1 | 0 |
| 176 | 0 | 0 | 0 | 0 | 1 | 1 | 0 | 1 | 0 | 1 | 0 | 1 | 1 | 0 | 0 | 0 | 0 | 0 | 0 | 0 | 0 | 1 | 0 | 1 | 0 | 1 | 1 | 1 | 0 | 1 | 1 | 1 |
| 177 | 1 | 0 | 0 | 0 | 1 | 1 | 0 | 1 | 1 | 1 | 0 | 0 | 0 | 1 | 0 | 0 | 1 | 0 | 0 | 0 | 1 | 1 | 1 | 1 | 0 | 1 | 1 | 1 | 0 | 0 | 0 | 1 |
| 178 | 0 | 1 | 0 | 0 | 1 | 1 | 0 | 1 | 0 | 0 | 0 | 1 | 0 | 1 | 1 | 0 | 0 | 1 | 0 | 0 | 0 | 0 | 0 | 0 | 0 | 1 | 1 | 1 | 0 | 0 | 0 | 1 |
| 179 | 1 | 1 | 0 | 0 | 1 | 1 | 0 | 1 | 1 | 0 | 0 | 0 | 1 | 0 | 1 | 0 | 1 | 1 | 0 | 0 | 1 | 0 | 1 | 0 | 0 | 1 | 1 | 1 | 0 | 1 | 1 | 1 |
| 180 | 0 | 0 | 1 | 0 | 1 | 1 | 0 | 1 | 0 | 1 | 1 | 1 | 1 | 1 | 1 | 1 | 0 | 0 | 0 | 0 | 0 | 1 | 0 | 0 | 1 | 1 | 1 | 1 | 1 | 1 | 0 | 0 |
| 181 | 1 | 0 | 1 | 0 | 1 | 1 | 0 | 1 | 1 | 1 | 1 | 0 | 0 | 0 | 1 | 1 | 1 | 0 | 0 | 0 | 1 | 1 | 1 | 0 | 1 | 1 | 1 | 1 | 1 | 0 | 1 | 0 |
| 182 | 0 | 1 | 1 | 0 | 1 | 1 | 0 | 1 | 0 | 0 | 1 | 1 | 0 | 0 | 0 | 1 | 0 | 1 | 0 | 0 | 0 | 0 | 0 | 1 | 1 | 1 | 1 | 1 | 1 | 0 | 1 | 0 |
| 183 | 1 | 1 | 1 | 0 | 1 | 1 | 0 | 1 | 1 | 0 | 1 | 0 | 1 | 1 | 0 | 1 | 1 | 1 | 0 | 0 | 1 | 0 | 1 | 1 | 1 | 1 | 1 | 1 | 1 | 1 | 0 | 0 |
| 184 | 0 | 0 | 0 | 1 | 1 | 1 | 0 | 1 | 1 | 1 | 0 | 1 | 0 | 1 | 1 | 1 | 0 | 0 | 1 | 0 | 1 | 1 | 0 | 0 | 0 | 1 | 1 | 1 | 0 | 0 | 0 | 0 |
| 185 | 1 | 0 | 0 | 1 | 1 | 1 | 0 | 1 | 0 | 1 | 0 | 0 | 1 | 0 | 1 | 1 | 1 | 0 | 1 | 0 | 0 | 1 | 1 | 0 | 0 | 1 | 1 | 1 | 0 | 1 | 1 | 0 |
| 186 | 0 | 1 | 0 | 1 | 1 | 1 | 0 | 1 | 1 | 0 | 0 | 1 | 1 | 0 | 0 | 1 | 0 | 1 | 1 | 0 | 1 | 0 | 0 | 1 | 0 | 1 | 1 | 1 | 0 | 1 | 1 | 0 |
| 187 | 1 | 1 | 0 | 1 | 1 | 1 | 0 | 1 | 0 | 0 | 0 | 0 | 0 | 1 | 0 | 1 | 1 | 1 | 1 | 0 | 0 | 0 | 1 | 1 | 0 | 1 | 1 | 1 | 0 | 0 | 0 | 0 |
| 188 | 0 | 0 | 1 | 1 | 1 | 1 | 0 | 1 | 1 | 1 | 1 | 1 | 0 | 0 | 0 | 0 | 0 | 0 | 1 | 0 | 1 | 1 | 0 | 1 | 1 | 1 | 1 | 1 | 1 | 0 | 1 | 1 |
| 189 | 1 | 0 | 1 | 1 | 1 | 1 | 0 | 1 | 0 | 1 | 1 | 0 | 1 | 1 | 0 | 0 | 1 | 0 | 1 | 0 | 0 | 1 | 1 | 1 | 1 | 1 | 1 | 1 | 1 | 1 | 0 | 1 |
| 190 | 0 | 1 | 1 | 1 | 1 | 1 | 0 | 1 | 1 | 0 | 1 | 1 | 1 | 1 | 1 | 0 | 0 | 1 | 1 | 0 | 1 | 0 | 0 | 0 | 1 | 1 | 1 | 1 | 1 | 1 | 0 | 1 |
| 191 | 1 | 1 | 1 | 1 | 1 | 1 | 0 | 1 | 0 | 0 | 1 | 0 | 0 | 0 | 1 | 0 | 1 | 1 | 1 | 0 | 0 | 0 | 1 | 0 | 1 | 1 | 1 | 1 | 1 | 0 | 1 | 1 |
| 192 | 0 | 0 | 0 | 0 | 0 | 0 | 1 | 1 | 1 | 0 | 0 | 1 | 0 | 1 | 1 | 0 | 0 | 0 | 0 | 1 | 1 | 0 | 0 | 0 | 0 | 0 | 0 | 1 | 0 | 0 | 0 | 1 |
| 193 | 1 | 0 | 0 | 0 | 0 | 0 | 1 | 1 | 0 | 0 | 0 | 0 | 1 | 0 | 1 | 0 | 1 | 0 | 0 | 1 | 0 | 0 | 1 | 0 | 0 | 0 | 0 | 1 | 0 | 1 | 1 | 1 |
| 194 | 0 | 1 | 0 | 0 | 0 | 0 | 1 | 1 | 1 | 1 | 0 | 1 | 1 | 0 | 0 | 0 | 0 | 1 | 0 | 1 | 1 | 1 | 0 | 1 | 0 | 0 | 0 | 1 | 0 | 1 | 1 | 1 |
| 195 | 1 | 1 | 0 | 0 | 0 | 0 | 1 | 1 | 0 | 1 | 0 | 0 | 0 | 1 | 0 | 0 | 1 | 1 | 0 | 1 | 0 | 1 | 1 | 1 | 0 | 0 | 0 | 1 | 0 | 0 | 0 | 1 |
| 196 | 0 | 0 | 1 | 0 | 0 | 0 | 1 | 1 | 1 | 0 | 1 | 1 | 0 | 0 | 0 | 1 | 0 | 0 | 0 | 1 | 1 | 0 | 0 | 1 | 1 | 0 | 0 | 1 | 1 | 0 | 1 | 0 |
| 197 | 1 | 0 | 1 | 0 | 0 | 0 | 1 | 1 | 0 | 0 | 1 | 0 | 1 | 1 | 0 | 1 | 1 | 0 | 0 | 1 | 0 | 0 | 1 | 1 | 1 | 0 | 0 | 1 | 1 | 1 | 0 | 0 |
| 198 | 0 | 1 | 1 | 0 | 0 | 0 | 1 | 1 | 1 | 1 | 1 | 1 | 1 | 1 | 1 | 1 | 0 | 1 | 0 | 1 | 1 | 1 | 0 | 0 | 1 | 0 | 0 | 1 | 1 | 1 | 0 | 0 |
| 199 | 1 | 1 | 1 | 0 | 0 | 0 | 1 | 1 | 0 | 1 | 1 | 0 | 0 | 0 | 1 | 1 | 1 | 1 | 0 | 1 | 0 | 1 | 1 | 0 | 1 | 0 | 0 | 1 | 1 | 0 | 1 | 0 |

TABLE 11-continued

| DATA WORD | STANDARD ERROR 1χ | | | | | | | | CORRECTING CODE 2χ | | | | | | | | IMPROVED ERROR 1γ | | | | | | | | CORRECTING CODE 2γ | | | | | | | |
|---|---|---|---|---|---|---|---|---|---|---|---|---|---|---|---|---|---|---|---|---|---|---|---|---|---|---|---|---|---|---|---|---|
| x | 1 | 2 | 3 | 4 | 5 | 6 | 7 | 8 | A | B | C | D | E | F | G | H | 1 | 2 | 4 | 7 | A | B | $\overline{D}$ | $\overline{G}$ | 3 | 5 | 6 | 8 | C | E | $\overline{F}$ | $\overline{G}$ |
| 200 | 0 | 0 | 0 | 1 | 0 | 0 | 1 | 1 | 0 | 0 | 0 | 1 | 1 | 0 | 0 | 1 | 0 | 0 | 1 | 1 | 0 | 0 | 0 | 1 | 0 | 0 | 0 | 1 | 0 | 1 | 1 | 0 |
| 201 | 1 | 0 | 0 | 1 | 0 | 0 | 1 | 1 | 1 | 0 | 0 | 0 | 0 | 1 | 0 | 1 | 1 | 0 | 1 | 1 | 1 | 0 | 1 | 1 | 0 | 0 | 0 | 1 | 0 | 0 | 0 | 0 |
| 202 | 0 | 1 | 0 | 1 | 0 | 0 | 1 | 1 | 0 | 1 | 0 | 1 | 0 | 1 | 1 | 1 | 0 | 1 | 1 | 1 | 0 | 1 | 0 | 0 | 0 | 0 | 0 | 1 | 0 | 0 | 0 | 0 |
| 203 | 1 | 1 | 0 | 1 | 0 | 0 | 1 | 1 | 1 | 1 | 0 | 0 | 1 | 0 | 1 | 1 | 1 | 1 | 1 | 1 | 1 | 1 | 1 | 0 | 0 | 0 | 0 | 1 | 0 | 1 | 1 | 0 |
| 204 | 0 | 0 | 1 | 1 | 0 | 0 | 1 | 1 | 0 | 0 | 1 | 1 | 1 | 1 | 1 | 0 | 0 | 0 | 1 | 1 | 0 | 0 | 0 | 0 | 1 | 0 | 0 | 1 | 1 | 1 | 0 | 1 |
| 205 | 1 | 0 | 1 | 1 | 0 | 0 | 1 | 1 | 1 | 0 | 1 | 0 | 0 | 0 | 1 | 0 | 1 | 0 | 1 | 1 | 1 | 0 | 1 | 0 | 1 | 0 | 0 | 1 | 1 | 0 | 1 | 1 |
| 206 | 0 | 1 | 1 | 1 | 0 | 0 | 1 | 1 | 0 | 1 | 1 | 1 | 0 | 0 | 0 | 0 | 0 | 1 | 1 | 1 | 0 | 1 | 0 | 1 | 1 | 0 | 0 | 1 | 1 | 0 | 1 | 1 |
| 207 | 1 | 1 | 1 | 1 | 0 | 0 | 1 | 1 | 1 | 1 | 1 | 0 | 1 | 1 | 0 | 0 | 1 | 1 | 1 | 1 | 1 | 1 | 1 | 1 | 1 | 0 | 0 | 1 | 1 | 1 | 0 | 1 |
| 208 | 0 | 0 | 0 | 0 | 1 | 0 | 1 | 1 | 0 | 1 | 0 | 0 | 1 | 1 | 0 | 1 | 0 | 0 | 0 | 1 | 0 | 1 | 1 | 1 | 0 | 1 | 0 | 1 | 0 | 1 | 0 | 0 |
| 209 | 1 | 0 | 0 | 0 | 1 | 0 | 1 | 1 | 1 | 1 | 0 | 1 | 0 | 0 | 0 | 1 | 1 | 0 | 0 | 1 | 1 | 1 | 0 | 1 | 0 | 1 | 0 | 1 | 0 | 0 | 1 | 0 |
| 210 | 0 | 1 | 0 | 0 | 1 | 0 | 1 | 1 | 0 | 0 | 0 | 0 | 0 | 0 | 1 | 1 | 0 | 1 | 0 | 1 | 0 | 0 | 1 | 0 | 0 | 1 | 0 | 1 | 0 | 0 | 1 | 0 |
| 211 | 1 | 1 | 0 | 0 | 1 | 0 | 1 | 1 | 1 | 0 | 0 | 1 | 1 | 1 | 1 | 1 | 1 | 1 | 0 | 1 | 1 | 0 | 0 | 0 | 0 | 1 | 0 | 1 | 0 | 1 | 0 | 0 |
| 212 | 0 | 0 | 1 | 0 | 1 | 0 | 1 | 1 | 0 | 1 | 1 | 0 | 1 | 0 | 1 | 0 | 0 | 0 | 0 | 1 | 0 | 1 | 1 | 0 | 1 | 1 | 0 | 1 | 1 | 1 | 1 | 1 |
| 213 | 1 | 0 | 1 | 0 | 1 | 0 | 1 | 1 | 1 | 1 | 1 | 1 | 0 | 1 | 1 | 0 | 1 | 0 | 0 | 1 | 1 | 1 | 0 | 0 | 1 | 1 | 0 | 1 | 1 | 0 | 0 | 1 |
| 214 | 0 | 1 | 1 | 0 | 1 | 0 | 1 | 1 | 0 | 0 | 1 | 0 | 0 | 1 | 0 | 0 | 0 | 1 | 0 | 1 | 0 | 0 | 1 | 1 | 1 | 1 | 0 | 1 | 1 | 0 | 0 | 1 |
| 215 | 1 | 1 | 1 | 0 | 1 | 0 | 1 | 1 | 1 | 0 | 1 | 1 | 1 | 0 | 0 | 0 | 1 | 1 | 0 | 1 | 1 | 0 | 0 | 1 | 1 | 1 | 0 | 1 | 1 | 1 | 1 | 1 |
| 216 | 0 | 0 | 0 | 1 | 1 | 0 | 1 | 1 | 1 | 1 | 0 | 0 | 0 | 0 | 1 | 0 | 0 | 0 | 1 | 1 | 1 | 1 | 1 | 0 | 0 | 1 | 0 | 1 | 0 | 0 | 1 | 1 |
| 217 | 1 | 0 | 0 | 1 | 1 | 0 | 1 | 1 | 0 | 1 | 0 | 1 | 1 | 1 | 1 | 0 | 1 | 0 | 1 | 1 | 0 | 1 | 0 | 0 | 0 | 1 | 0 | 1 | 0 | 1 | 0 | 1 |
| 218 | 0 | 1 | 0 | 1 | 1 | 0 | 1 | 1 | 1 | 0 | 0 | 0 | 1 | 1 | 0 | 0 | 0 | 1 | 1 | 1 | 1 | 0 | 1 | 1 | 0 | 1 | 0 | 1 | 0 | 1 | 0 | 1 |
| 219 | 1 | 1 | 0 | 1 | 1 | 0 | 1 | 1 | 0 | 0 | 0 | 1 | 0 | 0 | 0 | 0 | 1 | 1 | 1 | 1 | 0 | 0 | 0 | 1 | 0 | 1 | 0 | 1 | 0 | 0 | 1 | 1 |
| 220 | 0 | 0 | 1 | 1 | 1 | 0 | 1 | 1 | 1 | 1 | 1 | 0 | 0 | 1 | 0 | 1 | 0 | 0 | 1 | 1 | 1 | 1 | 1 | 1 | 1 | 1 | 0 | 1 | 1 | 0 | 0 | 0 |
| 221 | 1 | 0 | 1 | 1 | 1 | 0 | 1 | 1 | 0 | 1 | 1 | 1 | 1 | 0 | 0 | 1 | 1 | 0 | 1 | 1 | 0 | 1 | 0 | 1 | 1 | 1 | 0 | 1 | 1 | 1 | 1 | 0 |
| 222 | 0 | 1 | 1 | 1 | 1 | 0 | 1 | 1 | 1 | 0 | 1 | 0 | 1 | 0 | 1 | 1 | 0 | 1 | 1 | 1 | 1 | 0 | 1 | 0 | 1 | 1 | 0 | 1 | 1 | 1 | 1 | 0 |
| 223 | 1 | 1 | 1 | 1 | 1 | 0 | 1 | 1 | 0 | 0 | 1 | 1 | 0 | 1 | 1 | 1 | 1 | 1 | 1 | 1 | 0 | 0 | 0 | 0 | 1 | 1 | 0 | 1 | 1 | 0 | 0 | 0 |
| 224 | 0 | 0 | 0 | 0 | 0 | 1 | 1 | 1 | 0 | 1 | 1 | 0 | 0 | 1 | 1 | 1 | 0 | 0 | 0 | 1 | 0 | 1 | 1 | 0 | 0 | 0 | 1 | 1 | 1 | 0 | 0 | 0 |
| 225 | 1 | 0 | 0 | 0 | 0 | 1 | 1 | 1 | 1 | 1 | 1 | 1 | 1 | 0 | 1 | 1 | 1 | 0 | 0 | 1 | 1 | 1 | 0 | 0 | 0 | 0 | 1 | 1 | 1 | 1 | 1 | 0 |
| 226 | 0 | 1 | 0 | 0 | 0 | 1 | 1 | 1 | 0 | 0 | 1 | 0 | 1 | 0 | 0 | 1 | 0 | 1 | 0 | 1 | 0 | 0 | 1 | 1 | 0 | 0 | 1 | 1 | 1 | 1 | 1 | 0 |
| 227 | 1 | 1 | 0 | 0 | 0 | 1 | 1 | 1 | 1 | 0 | 1 | 1 | 0 | 1 | 0 | 1 | 1 | 1 | 0 | 1 | 1 | 0 | 0 | 1 | 0 | 0 | 1 | 1 | 1 | 0 | 0 | 0 |
| 228 | 0 | 0 | 1 | 0 | 0 | 1 | 1 | 1 | 0 | 1 | 0 | 0 | 0 | 0 | 0 | 0 | 0 | 0 | 0 | 1 | 0 | 1 | 1 | 1 | 1 | 0 | 1 | 1 | 0 | 0 | 1 | 1 |
| 229 | 1 | 0 | 1 | 0 | 0 | 1 | 1 | 1 | 1 | 1 | 0 | 1 | 1 | 1 | 0 | 0 | 1 | 0 | 0 | 1 | 1 | 1 | 0 | 1 | 1 | 0 | 1 | 1 | 0 | 1 | 0 | 1 |
| 230 | 0 | 1 | 1 | 0 | 0 | 1 | 1 | 1 | 0 | 0 | 0 | 0 | 1 | 1 | 1 | 0 | 0 | 1 | 0 | 1 | 0 | 0 | 1 | 0 | 1 | 0 | 1 | 1 | 0 | 1 | 0 | 1 |
| 231 | 1 | 1 | 1 | 0 | 0 | 1 | 1 | 1 | 1 | 0 | 0 | 1 | 0 | 0 | 1 | 0 | 1 | 1 | 0 | 1 | 1 | 0 | 0 | 0 | 1 | 0 | 1 | 1 | 0 | 0 | 1 | 1 |
| 232 | 0 | 0 | 0 | 1 | 0 | 1 | 1 | 1 | 1 | 1 | 1 | 0 | 1 | 0 | 0 | 0 | 0 | 0 | 1 | 1 | 1 | 1 | 1 | 1 | 0 | 0 | 1 | 1 | 1 | 1 | 1 | 1 |
| 233 | 1 | 0 | 0 | 1 | 0 | 1 | 1 | 1 | 0 | 1 | 1 | 1 | 0 | 1 | 0 | 0 | 1 | 0 | 1 | 1 | 0 | 1 | 0 | 1 | 0 | 0 | 1 | 1 | 1 | 0 | 0 | 1 |
| 234 | 0 | 1 | 0 | 1 | 0 | 1 | 1 | 1 | 1 | 0 | 1 | 0 | 0 | 1 | 1 | 0 | 0 | 1 | 1 | 1 | 1 | 0 | 1 | 0 | 0 | 0 | 1 | 1 | 1 | 0 | 0 | 1 |
| 235 | 1 | 1 | 0 | 1 | 0 | 1 | 1 | 1 | 0 | 0 | 1 | 1 | 1 | 0 | 1 | 0 | 1 | 1 | 1 | 1 | 0 | 0 | 0 | 0 | 0 | 0 | 1 | 1 | 1 | 1 | 1 | 1 |
| 236 | 0 | 0 | 1 | 1 | 0 | 1 | 1 | 1 | 1 | 1 | 0 | 0 | 1 | 1 | 1 | 1 | 0 | 0 | 1 | 1 | 1 | 1 | 1 | 0 | 1 | 0 | 1 | 1 | 0 | 1 | 0 | 0 |
| 237 | 1 | 0 | 1 | 1 | 0 | 1 | 1 | 1 | 0 | 1 | 0 | 1 | 0 | 0 | 1 | 1 | 1 | 0 | 1 | 1 | 0 | 1 | 0 | 0 | 1 | 0 | 1 | 1 | 0 | 0 | 1 | 0 |
| 238 | 0 | 1 | 1 | 1 | 0 | 1 | 1 | 1 | 1 | 0 | 0 | 0 | 0 | 0 | 0 | 1 | 0 | 1 | 1 | 1 | 1 | 0 | 1 | 1 | 1 | 0 | 1 | 1 | 0 | 0 | 1 | 0 |
| 239 | 1 | 1 | 1 | 1 | 0 | 1 | 1 | 1 | 0 | 0 | 0 | 1 | 1 | 1 | 0 | 1 | 1 | 1 | 1 | 1 | 0 | 0 | 0 | 1 | 1 | 0 | 1 | 1 | 0 | 1 | 0 | 0 |
| 240 | 0 | 0 | 0 | 0 | 1 | 1 | 1 | 1 | 1 | 0 | 1 | 1 | 1 | 1 | 0 | 0 | 0 | 0 | 0 | 1 | 1 | 0 | 0 | 1 | 0 | 1 | 1 | 1 | 1 | 1 | 0 | 1 |
| 241 | 1 | 0 | 0 | 0 | 1 | 1 | 1 | 1 | 0 | 0 | 1 | 0 | 0 | 0 | 0 | 0 | 1 | 0 | 0 | 1 | 0 | 0 | 1 | 1 | 0 | 1 | 1 | 1 | 1 | 0 | 1 | 1 |
| 242 | 0 | 1 | 0 | 0 | 1 | 1 | 1 | 1 | 1 | 1 | 1 | 1 | 0 | 0 | 1 | 0 | 0 | 1 | 0 | 1 | 1 | 1 | 0 | 0 | 0 | 1 | 1 | 1 | 1 | 0 | 1 | 1 |
| 243 | 1 | 1 | 0 | 0 | 1 | 1 | 1 | 1 | 0 | 1 | 1 | 0 | 1 | 1 | 1 | 0 | 1 | 1 | 0 | 1 | 0 | 1 | 1 | 0 | 0 | 1 | 1 | 1 | 1 | 1 | 0 | 1 |
| 244 | 0 | 0 | 1 | 0 | 1 | 1 | 1 | 1 | 1 | 0 | 0 | 1 | 1 | 0 | 1 | 1 | 0 | 0 | 0 | 1 | 1 | 0 | 0 | 0 | 1 | 1 | 1 | 1 | 0 | 1 | 1 | 0 |
| 245 | 1 | 0 | 1 | 0 | 1 | 1 | 1 | 1 | 0 | 0 | 0 | 0 | 0 | 1 | 1 | 1 | 1 | 0 | 0 | 1 | 0 | 0 | 1 | 0 | 1 | 1 | 1 | 1 | 0 | 0 | 0 | 0 |
| 246 | 0 | 1 | 1 | 0 | 1 | 1 | 1 | 1 | 1 | 1 | 0 | 1 | 0 | 1 | 0 | 1 | 0 | 1 | 0 | 1 | 1 | 1 | 0 | 1 | 1 | 1 | 1 | 1 | 0 | 0 | 0 | 0 |
| 247 | 1 | 1 | 1 | 0 | 1 | 1 | 1 | 1 | 0 | 1 | 0 | 0 | 1 | 0 | 0 | 1 | 1 | 1 | 0 | 1 | 0 | 1 | 1 | 1 | 1 | 1 | 1 | 1 | 0 | 1 | 1 | 0 |
| 248 | 0 | 0 | 0 | 1 | 1 | 1 | 1 | 1 | 0 | 0 | 1 | 1 | 0 | 0 | 1 | 1 | 0 | 0 | 1 | 1 | 0 | 0 | 0 | 0 | 0 | 1 | 1 | 1 | 1 | 0 | 1 | 0 |
| 249 | 1 | 0 | 0 | 1 | 1 | 1 | 1 | 1 | 1 | 0 | 1 | 0 | 1 | 1 | 1 | 1 | 1 | 0 | 1 | 1 | 1 | 0 | 1 | 0 | 0 | 1 | 1 | 1 | 1 | 1 | 0 | 0 |

TABLE 11-continued

| DATA WORD | STANDARD ERROR $1\chi$ | | | | | | | | CORRECTING CODE $2\chi$ | | | | | | | | IMPROVED ERROR $1\gamma$ | | | | | | | | CORRECTING CODE $2\gamma$ | | | | | | | |
|---|---|---|---|---|---|---|---|---|---|---|---|---|---|---|---|---|---|---|---|---|---|---|---|---|---|---|---|---|---|---|---|---|
| x | 1 | 2 | 3 | 4 | 5 | 6 | 7 | 8 | A | B | C | D | E | F | G | H | 1 | 2 | 4 | 7 | A | B | $\bar{\bar{D}}$ | $\bar{\bar{G}}$ | 3 | 5 | 6 | 8 | C | E | $\bar{F}$ | $\bar{G}$ |
| 250 | 0 | 1 | 0 | 1 | 1 | 1 | 1 | 1 | 0 | 1 | 1 | 1 | 1 | 1 | 0 | 1 | 0 | 1 | 1 | 1 | 0 | 1 | 0 | 1 | 0 | 1 | 1 | 1 | 1 | 1 | 0 | 0 |
| 251 | 1 | 1 | 0 | 1 | 1 | 1 | 1 | 1 | 1 | 1 | 1 | 0 | 0 | 0 | 0 | 1 | 1 | 1 | 1 | 1 | 1 | 1 | 1 | 1 | 0 | 1 | 1 | 1 | 1 | 0 | 1 | 0 |
| 252 | 0 | 0 | 1 | 1 | 1 | 1 | 1 | 1 | 0 | 0 | 0 | 1 | 0 | 1 | 0 | 0 | 0 | 0 | 1 | 1 | 0 | 0 | 0 | 1 | 1 | 1 | 1 | 1 | 0 | 0 | 0 | 1 |
| 253 | 1 | 0 | 1 | 1 | 1 | 1 | 1 | 1 | 1 | 0 | 0 | 0 | 1 | 0 | 0 | 0 | 1 | 0 | 1 | 1 | 1 | 0 | 1 | 1 | 1 | 1 | 1 | 1 | 0 | 1 | 1 | 1 |
| 254 | 0 | 1 | 1 | 1 | 1 | 1 | 1 | 1 | 0 | 1 | 0 | 1 | 1 | 0 | 1 | 0 | 0 | 1 | 1 | 1 | 0 | 1 | 0 | 0 | 1 | 1 | 1 | 1 | 0 | 1 | 1 | 1 |
| 255 | 1 | 1 | 1 | 1 | 1 | 1 | 1 | 1 | 1 | 1 | 0 | 0 | 0 | 1 | 1 | 0 | 1 | 1 | 1 | 1 | 1 | 1 | 1 | 0 | 1 | 1 | 1 | 1 | 0 | 0 | 0 | 1 |

What is claimed is

1. A multijunction unit for transferring digital data between at least three channels of a time-domain multiplexed communication link of a multipoint communication network which includes a plurality of network units with at least one of said network units comprising said multijunction unit, said network units coupled to telephone system communication links, each said network unit comprising means for transmitting and receiving digital data in a frame mode in which said data is organized into frames on said communication links, each said frame including synchronization data, command data, error correcting data, and user data, each said network unit further comprising:

means for storing an address identifying said network unit;

means for receiving commands from other network units in said computer network, said commands being specified by command data in a said frame received by said network unit;

means for generating command data in response to a received command included in said command data;

means for transmitting commands to other network units in said computer network, said transmitting means comprising means for inserting command data generated by said command data generating means into a said frame transmitted by said network unit; and means for executing a said received command specifying said stored address as the target thereof;

said multijunction unit further comprising:

first, second, and third input port means, each said input port means being coupled to a different incoming channel of a time-domain multiplexed communication link, each said input port means comprising means for receiving a primary channel word from the said incoming primary channel coupled thereto and first decrypting means for generating a data word corresponding to each said received primary channel word, each said generated data word comprising a portion of a said frame;

first, second, and third output port means, each said output port means being coupled to a different primary outgoing channel of said time-domain multiplexed communication link, each said output port means comprising means for receiving a said data word, first encrypting means for generating a said primary channel word from said received data word and means for transmitting said primary channel word on the said outgoing primary channel coupled thereto;

means for coupling a data word generated by said first input channel to the said receiving means in said second and third output port means; and means for combining the said data words generated by said second and third input port means to form a combined data word and for coupling said combined data word to the said receiving means in said first output port means.

2. The multijunction unit of claim 1 wherein said first decrypting means comprises copying the bits of said channel word to the corresponding bits of said data word, and wherein said first encrypting means comprises copying the bits of said data word to the corresponding bits of said channel word.

3. The multijunction unit of claim 1 wherein said combining means comprises means for ORing the corresponding bits of the said data words generated by said second and third input port means.

4. The multijunction unit of claim 1 wherein each said input port means further comprises:

means for coupling said input port means to a secondary incoming channel on said time-domain multiplexed communication link, a different secondary incoming channel being utilized for each said input port means;

means for receiving a secondary channel word on said secondary channel coupled thereto, each said secondary channel word corresponding to a said received primary channel word; and second decrypting means for combining said secondary channel word with the primary channel word corresponding thereto to form said data word, and wherein each said output port means further comprises:

means for coupling said output port means to a secondary outgoing channel on said time-domain multiplexed communication link, a different secondary outgoing channel being utilized for each said output port means;

second encrypting means for generated primary and secondary channel words from a said received data word and for transmitting said primary and secondary channel words respectively on the primary and secondary outgoing channels coupled thereto, and wherein said multijunction unit further comprises:

means responsive to a predetermined said command for determining which of said second encrypting means and said second decrypting means or said first encrypting means and said first decrypting means are operative.

5. The multijunction unit of claim 4 wherein said second decrypting means comprises means for decrypting two error encrypted words using an error correcting code, and wherein said second encrypting means comprises means for encrypting said data word using said error correcting code.

6. The multijunction unit of claim 1 wherein each of said first, second, and third input port means further comprise error detecting means for detecting transmission errors in said received frame, said error detecting means utilizing said error correcting data included in said frame.

7. The multijunction unit of claim 6 wherein each said error detecting means further comprises means for determining the rate at which errors are detected thereby and means, responsive to a predetermined one of said commands, for inserting data specifying said error rate into said command data of a said frame transmitted by the said output port means corresponding to said input port means.

8. The multijunction unit of claim 6 wherein each said input port means further comprises means for preventing said command executing means from executing a said command received in a said frame for which a said error detecting means detected a transmission error.

9. The multijunction unit of claim 6 wherein said combining means does not combine data words received in a said frame for which said error detecting means in the said port means receiving said frame detected a transmission error in said frame.

10. The multijunction unit of claim 1 further comprising command port means for receiving commands to be executed by said multijunction unit or by another said network unit, each said command to be executed by another said network unit being transmitted in said command data of a said frame transmitted by at least one of said first, second, or third output port means.

11. The multijunction unit of claim 1 wherein each said input and output port means further comprises means for setting the data rate at which said input port means receives a said frame and said output port means transmits a said frame, said data rate being selected from a plurality of loop data rates, wherein said rate setting means being responsive to predetermined said command and wherein all said input and output port means receive and transmit data at the same rate.

12. The multijunction unit of claim 11 wherein said first decrypting means further comprises means for combining a predetermined number of successively received channel words utilizing majority decision logic to form said data word, said predetermined number being determined by a predetermined said data rate and wherein said first encrypting means further comprises means for generating a said predetermined number of successive channels words by repeating each said encrypted channel word said predetermined number of times.

13. The multijunction unit of claim 1 further comprising means for transmitting and receiving data in a non-frame mode in which each said input port means receives channel words at a predetermined loop data rate and each said output data port means transmits channel words at said predetermined loop data rate, each said input port means further comprising means for detecting a switch sequence comprising a predetermined sequence of data words, said multijunction unit entering said non-frame mode in response to a predetermined one of said commands, and said multijunction resuming transmission in said frame mode upon detecting said switch sequence by any of said input port means.

14. The multijunction unit of claim 1 further comprising means responsive to a predetermined said command, for preventing an input port means specified in said command from receiving channel words and for preventing the corresponding output port means from transmitting channel words.

15. The multijunction unit of claim 1 further comprising means responsive to a predetermined said command and a predetermined value for said stored address, for causing said stored address to match an address specified in said command.

16. The multijunction unit of claim 1 further comprising means responsive to a first predetermined said command, for causing each said channel word transmitted by a said output port means specified in said command to be copied to the corresponding input port means until a second predetermined said command is received by said multijunction unit.

17. The multijunction unit of claim 1 further comprising loopback means responsive to a first predetermined said command, for causing each said channel word received by a said input port means specified in said command to be copied to the corresponding output port means until a second predetermined said command is received by said multijunction unit.

18. The multijunction unit of claim 1 further comprising means responsive to a predetermined said command being received by a said input port means for causing the said output port means corresponding to said input port means to output a said frame having null bits for all address and user data.

* * * * *

UNITED STATES PATENT AND TRADEMARK OFFICE

CERTIFICATE OF CORRECTION

PATENT NO. : 4,893,340

DATED : January 9, 1990

INVENTOR(S) : Lubarsky, et al.

It is certified that error appears in the above-identified patent and that said Letters Patent is hereby corrected as shown below:

Column 6, line 45, delete "throughout" and insert therefor --throughput--.

Column 9, line 21, delete "killed" and insert therefor --filled--.

Column 18, line 34, delete "472b" are insert therefor --472b are--.

Column 4, line 27, after "Figure 8" insert --is--.

Column 14, line 37, delete "as" before "$O_2$".

Column 18, line 10, delete "in" before "Fig. 7(a)".

Column 20, line 60, before "present" insert --the--

Column 23, line 8, delete "more to the" and insert therefor --more of the--.

Signed and Sealed this

Twenty-sixth Day of May, 1992

*Attest:*

DOUGLAS B. COMER

*Attesting Officer*

*Acting Commissioner of Patents and Trademarks*